(12) United States Patent
George et al.

(10) Patent No.: US 7,787,823 B2
(45) Date of Patent: Aug. 31, 2010

(54) RADIO-OVER-FIBER (ROF) OPTICAL FIBER CABLE SYSTEM WITH TRANSPONDER DIVERSITY AND ROF WIRELESS PICOCELLULAR SYSTEM USING SAME

(75) Inventors: Jacob George, Horseheads, NY (US); Michael Sauer, Corning, NY (US)

(73) Assignee: Corning Cable Systems LLC, Hickory, NC (US)

( * ) Notice: Subject to any disclaimer, the term of this patent is extended or adjusted under 35 U.S.C. 154(b) by 858 days.

(21) Appl. No.: 11/521,717

(22) Filed: Sep. 15, 2006

(65) Prior Publication Data

US 2008/0070502 A1     Mar. 20, 2008

(51) Int. Cl.
 *H04B 7/00* (2006.01)
 *H04W 36/00* (2009.01)
(52) U.S. Cl. ............... 455/41.2; 455/41.3; 455/443
(58) Field of Classification Search ............. 455/41.2, 455/41.3, 437–440, 442, 443, 421, 422.1, 455/449, 446; 380/256; 379/56.2
See application file for complete search history.

(56) References Cited

U.S. PATENT DOCUMENTS

| | | |
|---|---|---|
| 4,365,865 A | 12/1982 | Stiles |
| 4,867,527 A | 9/1989 | Dotti et al. |
| 4,889,977 A | 12/1989 | Haydon |
| 4,896,939 A | 1/1990 | O'Brien |
| 4,916,460 A | 4/1990 | Powell ............... 343/853 |
| 5,039,195 A | 8/1991 | Jenkins et al. |
| 5,042,086 A | 8/1991 | Cole et al. |
| 5,125,060 A | 6/1992 | Edmundson |
| 5,189,718 A | 2/1993 | Barrett et al. |
| 5,189,719 A | 2/1993 | Coleman et al. |
| 5,210,812 A | 5/1993 | Nilsson et al. |
| 5,260,957 A | 11/1993 | Hakimi et al. |

(Continued)

FOREIGN PATENT DOCUMENTS

AU     645192 B     10/1992

(Continued)

OTHER PUBLICATIONS

Wake, D. et al., "Passive Picocell: A New Concept in Wireless Network Infrastructure," Electronics Letters, vol. 33, No. 5, Feb. 27, 1997, pp. 404-406.

(Continued)

*Primary Examiner*—Eugene Yun
(74) *Attorney, Agent, or Firm*—C. Keith Montgomery

(57) ABSTRACT

A radio-over-fiber (RoF) optical fiber cable system with transponder diversity for a RoF wireless picocellular system that includes at least one optical fiber cable. The at least one optical fiber cable supports one or more groups of two or more transponders, wherein the transponders in a given group are arranged to form substantially co-located picocells. The transponders in each transponder group may also have one of two orthogonal antenna polarizations. A diversity combiner optically coupled to each transponder determines respective signal strengths from each transponder in each transponder group. The transponder with the greatest signal strength in a given transponder group is selected to form the picocell for the given group. This allows for the optical fiber cable system to adjust to changes in the signal strength of each picocell, such as caused by a transponder obstruction or failure.

20 Claims, 14 Drawing Sheets

U.S. PATENT DOCUMENTS

| | | | |
|---|---|---|---|
| 5,263,108 A | 11/1993 | Kurokawa et al. | |
| 5,267,122 A | 11/1993 | Glover et al. | |
| 5,268,971 A | 12/1993 | Nilsson et al. | |
| 5,299,947 A | 4/1994 | Barnard | |
| 5,301,056 A | 4/1994 | O'Neill | 359/145 |
| 5,339,058 A | 8/1994 | Lique | |
| 5,339,184 A | 8/1994 | Tang | 359/124 |
| 5,377,035 A | 12/1994 | Wang et al. | 359/156 |
| 5,379,455 A | 1/1995 | Koschek | |
| 5,400,391 A | 3/1995 | Emura et al. | 379/59 |
| 5,424,864 A | 6/1995 | Emura | 359/173 |
| 5,444,564 A | 8/1995 | Newberg | 359/187 |
| 5,457,557 A | 10/1995 | Zarem et al. | 359/121 |
| 5,459,727 A | 10/1995 | Vannucci | |
| 5,469,523 A | 11/1995 | Blew et al. | |
| 5,543,000 A | 8/1996 | Lique | |
| 5,546,443 A | 8/1996 | Raith | |
| 5,557,698 A | 9/1996 | Gareis et al. | |
| 5,574,815 A | 11/1996 | Kneeland | |
| 5,598,288 A | 1/1997 | Collar | |
| 5,615,034 A | 3/1997 | Hori | |
| 5,627,879 A | 5/1997 | Russell et al. | 379/59 |
| 5,640,678 A | 6/1997 | Ishikawa et al. | 455/33.2 |
| 5,644,622 A | 7/1997 | Russell et al. | 455/422 |
| 5,648,961 A | 7/1997 | Ebihara | 370/282 |
| 5,651,081 A | 7/1997 | Blew et al. | |
| 5,668,562 A | 9/1997 | Cutrer et al. | |
| 5,677,974 A | 10/1997 | Elms et al. | |
| 5,682,256 A | 10/1997 | Motley et al. | 359/117 |
| 5,703,602 A | 12/1997 | Casebolt | |
| 5,790,606 A | 8/1998 | Dent | |
| 5,802,473 A | 9/1998 | Rutledge et al. | |
| 5,805,983 A | 9/1998 | Naidu et al. | |
| 5,812,296 A | 9/1998 | Tarusawa et al. | |
| 5,818,619 A | 10/1998 | Medved et al. | |
| 5,821,510 A | 10/1998 | Cohen et al. | |
| 5,825,651 A | 10/1998 | Gupta et al. | |
| 5,838,474 A | 11/1998 | Stilling | |
| 5,854,986 A | 12/1998 | Dorren et al. | |
| 5,867,485 A | 2/1999 | Chambers et al. | 370/281 |
| 5,881,200 A | 3/1999 | Burt | |
| 5,883,882 A | 3/1999 | Schwartz | |
| 5,896,568 A | 4/1999 | Tseng et al. | |
| 5,903,834 A | 5/1999 | Wallstedt et al. | |
| 5,910,776 A | 6/1999 | Black | |
| 5,913,003 A | 6/1999 | Arroyo et al. | |
| 5,917,636 A | 6/1999 | Wake et al. | |
| 5,930,682 A | 7/1999 | Schwartz et al. | |
| 5,936,754 A | 8/1999 | Ariyavisitakul et al. | 359/145 |
| 5,943,372 A | 8/1999 | Gans et al. | 375/347 |
| 5,946,622 A | 8/1999 | Bojeryd | 455/444 |
| 5,949,564 A | 9/1999 | Wake | |
| 5,959,531 A | 9/1999 | Gallagher, III et al. | |
| 5,960,344 A | 9/1999 | Mahany | |
| 5,969,837 A | 10/1999 | Farber et al. | 359/132 |
| 5,983,070 A | 11/1999 | Georges et al. | |
| 5,987,303 A | 11/1999 | Dutta et al. | |
| 6,005,884 A | 12/1999 | Cook et al. | 375/202 |
| 6,006,105 A | 12/1999 | Rostoker et al. | |
| 6,014,546 A | 1/2000 | Georges et al. | |
| 6,016,426 A | 1/2000 | Bodell | 455/422 |
| 6,023,625 A | 2/2000 | Myers, Jr. | |
| 6,088,381 A | 7/2000 | Myers, Jr. | |
| 6,127,917 A | 10/2000 | Tuttle | 340/10.1 |
| 6,128,470 A | 10/2000 | Naidu et al. | 455/16 |
| 6,148,041 A | 11/2000 | Dent | |
| 6,150,921 A | 11/2000 | Werb et al. | 340/10.1 |
| 6,157,810 A | 12/2000 | Georges et al. | |
| 6,232,870 B1 | 5/2001 | Garber et al. | |
| 6,236,789 B1 | 5/2001 | Fitz | |
| 6,240,274 B1 | 5/2001 | Izadpanah | |
| 6,268,946 B1 | 7/2001 | Larkin et al. | 359/173 |
| 6,292,673 B1 | 9/2001 | Maeda et al. | 455/522 |
| 6,314,163 B1 | 11/2001 | Acampora | |
| 6,323,980 B1 | 11/2001 | Bloom | |
| 6,324,391 B1 | 11/2001 | Bodell | 455/403 |
| 6,337,754 B1 | 1/2002 | Imajo | 359/174 |
| 6,353,406 B1 | 3/2002 | Lanzl et al. | 342/118 |
| 6,353,600 B1 | 3/2002 | Schwartz et al. | |
| 6,374,078 B1 | 4/2002 | Williams et al. | |
| 6,374,124 B1 | 4/2002 | Slabinski | 455/562 |
| 6,405,018 B1 | 6/2002 | Reudink et al. | 455/20 |
| 6,405,058 B2 | 6/2002 | Bobier | 455/562 |
| 6,405,308 B1 | 6/2002 | Gupta et al. | |
| 6,438,301 B1 | 8/2002 | Johnson et al. | |
| 6,438,371 B1 | 8/2002 | Fujise et al. | 455/422 |
| 6,477,154 B1 | 11/2002 | Cheong et al. | 370/328 |
| 6,486,907 B1 | 11/2002 | Farber et al. | |
| 6,501,965 B1 | 12/2002 | Lucidarme | 455/562 |
| 6,504,636 B1 | 1/2003 | Seto et al. | |
| 6,512,478 B1 | 1/2003 | Chien | |
| 6,519,395 B1 | 2/2003 | Bevan et al. | |
| 6,525,855 B1 | 2/2003 | Westbrook et al. | 359/145 |
| 6,556,551 B1 | 4/2003 | Schwartz | |
| 6,577,794 B1 | 6/2003 | Currie et al. | |
| 6,577,801 B2 | 6/2003 | Broderick et al. | |
| 6,580,905 B1 | 6/2003 | Naidu et al. | |
| 6,580,918 B1 | 6/2003 | Leickel et al. | |
| 6,583,763 B2 | 6/2003 | Judd | |
| 6,594,496 B2 | 7/2003 | Schwartz | |
| 6,597,325 B2 | 7/2003 | Judd et al. | |
| 6,606,430 B2 | 8/2003 | Bartur et al. | |
| 6,634,811 B1 | 10/2003 | Gertel et al. | |
| 6,636,747 B2 | 10/2003 | Harada et al. | |
| 6,640,103 B1 | 10/2003 | Inman et al. | |
| 6,643,437 B1 | 11/2003 | Park | |
| 6,652,158 B2 | 11/2003 | Bartur et al. | |
| 6,654,616 B1 | 11/2003 | Pope, Jr. et al. | |
| 6,675,294 B1 | 1/2004 | Gupta et al. | |
| 6,687,437 B1 | 2/2004 | Starnes et al. | |
| 6,690,328 B2 | 2/2004 | Judd | |
| 6,704,545 B1 | 3/2004 | Wala | |
| 6,710,366 B1 | 3/2004 | Lee et al. | |
| 6,731,880 B2 | 5/2004 | Westbrook et al. | |
| 6,758,913 B1 | 7/2004 | Tunney et al. | |
| 6,771,862 B2 | 8/2004 | Karnik et al. | |
| 6,771,933 B1 | 8/2004 | Eng et al. | |
| 6,784,802 B1 | 8/2004 | Stanescu | |
| 6,785,558 B1 | 8/2004 | Stratford et al. | |
| 6,788,666 B1 | 9/2004 | Linebarger et al. | 370/338 |
| 6,801,767 B1 | 10/2004 | Schwartz et al. | 455/426.2 |
| 6,807,374 B1 | 10/2004 | Imajo et al. | 398/115 |
| 6,812,824 B1 | 11/2004 | Goldinger et al. | |
| 6,812,905 B2 | 11/2004 | Thomas et al. | |
| 6,826,337 B2 | 11/2004 | Linnell | |
| 6,847,856 B1 | 1/2005 | Bohannon | |
| 6,865,390 B2 | 3/2005 | Goss et al. | 455/445 |
| 6,873,823 B2 | 3/2005 | Hasarchi et al. | |
| 6,879,290 B1 | 4/2005 | Toutain et al. | |
| 6,883,710 B2 | 4/2005 | Chung | 235/385 |
| 6,885,846 B1 | 4/2005 | Panasik et al. | 455/41.2 |
| 6,889,060 B2 | 5/2005 | Fernando et al. | |
| 6,909,399 B1 | 6/2005 | Zegelin et al. | 342/463 |
| 6,915,058 B2 | 7/2005 | Pons | |
| 6,920,330 B2 | 7/2005 | Caronni et al. | 455/456.1 |
| 6,924,997 B2 | 8/2005 | Chen et al. | |
| 6,930,987 B1 | 8/2005 | Fukuda et al. | |
| 6,931,183 B2 | 8/2005 | Panak et al. | |
| 6,933,849 B2 | 8/2005 | Sawyer | 340/572.4 |
| 6,963,289 B2 | 11/2005 | Aljadeff et al. | |
| 6,963,552 B2 | 11/2005 | Sabat, Jr. et al. | |
| 6,965,718 B2 | 11/2005 | Koertel | 385/101 |
| 6,968,107 B2 | 11/2005 | Belardi et al. | |
| 6,970,652 B2 | 11/2005 | Zhang et al. | |

| | | | | | |
|---|---|---|---|---|---|
| 6,973,243 B2 | 12/2005 | Koyasu et al. | 2003/0174099 A1 | 9/2003 | Bauer et al. |
| 6,974,262 B1 | 12/2005 | Rickenbach | 2003/0209601 A1 | 11/2003 | Chung |
| 7,006,465 B2 * | 2/2006 | Toshimitsu et al. ......... 370/328 | 2004/0001719 A1 | 1/2004 | Sasaki |
| 7,013,087 B2 | 3/2006 | Suzuki et al. ............... 398/115 | 2004/0008114 A1 | 1/2004 | Sawyer |
| 7,020,473 B2 | 3/2006 | Splett ...................... 455/456.1 | 2004/0017785 A1 | 1/2004 | Zelst ......................... 370/328 |
| 7,035,512 B2 | 4/2006 | Van Bijsterveld | 2004/0041714 A1 | 3/2004 | Forster |
| 7,039,399 B2 | 5/2006 | Fischer ................... 455/422.1 | 2004/0043764 A1 | 3/2004 | Bigham et al. |
| 7,047,028 B2 | 5/2006 | Cagenius | 2004/0047313 A1 | 3/2004 | Rumpf et al. ............... 370/335 |
| 7,053,838 B2 | 5/2006 | Judd | 2004/0078151 A1 | 4/2004 | Aljadeff et al. |
| 7,054,513 B2 | 5/2006 | Herz et al. | 2004/0100930 A1 | 5/2004 | Shapira et al. |
| 7,072,586 B2 | 7/2006 | Aburakawa et al. ......... 398/115 | 2004/0126068 A1 | 7/2004 | Van Bijsterveld |
| 7,082,320 B2 | 7/2006 | Kattukaran et al. | 2004/0149736 A1 | 8/2004 | Clothier |
| 7,084,769 B2 | 8/2006 | Bauer et al. ............... 340/572.7 | 2004/0151503 A1 | 8/2004 | Kashima et al. |
| 7,093,985 B2 | 8/2006 | Lord et al. | 2004/0157623 A1 | 8/2004 | Splett |
| 7,106,931 B2 | 9/2006 | Sutehall et al. | 2004/0162115 A1 | 8/2004 | Smith et al. ............... 455/562.1 |
| 7,114,859 B1 | 10/2006 | Tuohimaa et al. | 2004/0162116 A1 | 8/2004 | Han et al. |
| 7,127,176 B2 | 10/2006 | Sasaki | 2004/0175173 A1 | 9/2004 | Deas |
| 7,142,503 B1 | 11/2006 | Grant et al. | 2004/0202257 A1 | 10/2004 | Mehta et al. ................. 375/267 |
| 7,160,032 B2 | 1/2007 | Nagashima et al. | 2004/0203703 A1 | 10/2004 | Fischer ........................ 385/24 |
| 7,200,305 B2 | 4/2007 | Dion et al. | 2004/0203704 A1 | 10/2004 | Ommodt et al. .......... 455/422.1 |
| 7,200,391 B2 | 4/2007 | Chung et al. | 2004/0203846 A1 | 10/2004 | Caronni et al. |
| 7,228,072 B2 | 6/2007 | Mickelsson et al. | 2004/0204109 A1 | 10/2004 | Hoppenstein ............ 455/562.1 |
| 7,263,293 B2 | 8/2007 | Ommodt et al. | 2004/0208526 A1 | 10/2004 | Mibu |
| 7,269,311 B2 | 9/2007 | Kim et al. | 2004/0218873 A1 | 11/2004 | Nagashima et al. |
| 7,286,843 B2 | 10/2007 | Scheck | 2004/0233877 A1 | 11/2004 | Lee et al. ..................... 370/338 |
| 7,286,854 B2 | 10/2007 | Ferrato et al. | 2004/0258105 A1 | 12/2004 | Spathas et al. ............... 370/539 |
| 7,295,119 B2 | 11/2007 | Rappaport et al. | 2005/0052287 A1 | 3/2005 | Whitesmith et al. |
| 7,310,430 B1 | 12/2007 | Mallya et al. | 2005/0058451 A1 | 3/2005 | Ross ........................... 398/70 |
| 7,313,415 B2 | 12/2007 | Wake et al. | 2005/0068179 A1 | 3/2005 | Roesner |
| 7,324,730 B2 | 1/2008 | Varkey et al. | 2005/0076982 A1 | 4/2005 | Metcalf et al. |
| 7,343,164 B2 | 3/2008 | Kallstenius | 2005/0078006 A1 | 4/2005 | Hutchins et al. |
| 7,349,633 B2 | 3/2008 | Lee et al. | 2005/0093679 A1 | 5/2005 | Zai et al. |
| 7,359,408 B2 | 4/2008 | Kim | 2005/0099343 A1 | 5/2005 | Asrani et al. ................. 343/702 |
| 7,366,150 B2 | 4/2008 | Lee et al. | 2005/0116821 A1 | 6/2005 | Wilsey et al. |
| 7,379,669 B2 | 5/2008 | Kim | 2005/0141545 A1 | 6/2005 | Fein et al. |
| 7,392,029 B2 | 6/2008 | Pronkine | 2005/0143077 A1 | 6/2005 | Charbonneau |
| 7,394,883 B2 | 7/2008 | Funakubo et al. | 2005/0148306 A1 | 7/2005 | Hiddink |
| 7,403,156 B2 | 7/2008 | Coppi et al. | 2005/0159108 A1 | 7/2005 | Fletcher et al. |
| 7,409,159 B2 | 8/2008 | Izadpanah | 2005/0174236 A1 | 8/2005 | Brookner |
| 7,424,228 B1 | 9/2008 | Williams et al. | 2005/0201761 A1 | 9/2005 | Bartur et al. |
| 7,444,051 B2 | 10/2008 | Tatat et al. | 2005/0219050 A1 | 10/2005 | Martin |
| 7,450,853 B2 | 11/2008 | Kim et al. | 2005/0224585 A1 | 10/2005 | Durrant et al. |
| 7,450,854 B2 | 11/2008 | Lee et al. | 2005/0226625 A1 | 10/2005 | Wake et al. .................. 398/115 |
| 7,460,829 B2 | 12/2008 | Utsumi et al. | 2005/0232636 A1 | 10/2005 | Durrant et al. |
| 7,460,831 B2 | 12/2008 | Hasarchi | 2005/0242188 A1 | 11/2005 | Vesuna |
| 7,466,925 B2 | 12/2008 | Iannelli | 2005/0252971 A1 | 11/2005 | Howarth et al. |
| 7,469,105 B2 | 12/2008 | Wake et al. | 2005/0259930 A1 | 11/2005 | Elkins, II et al. |
| 7,477,597 B2 | 1/2009 | Segel | 2005/0266797 A1 | 12/2005 | Utsumi et al. .................. 455/7 |
| 7,483,504 B2 | 1/2009 | Shapira et al. | 2005/0266854 A1 | 12/2005 | Niiho et al. .................. 455/445 |
| 7,496,070 B2 | 2/2009 | Vesuna | 2005/0271396 A1 | 12/2005 | Iannelli ....................... 398/193 |
| 7,496,384 B2 | 2/2009 | Seto et al. | 2006/0002326 A1 | 1/2006 | Vesuna |
| 7,522,252 B2 | 4/2009 | Fein et al. | 2006/0014548 A1 | 1/2006 | Bolin et al. |
| 7,548,695 B2 | 6/2009 | Wake | 2006/0017633 A1 | 1/2006 | Pronkine ..................... 343/729 |
| 7,590,354 B2 | 9/2009 | Sauer et al. | 2006/0045054 A1 | 3/2006 | Utsumi et al. |
| 2002/0003645 A1 | 1/2002 | Kim et al. | 2006/0062579 A1 | 3/2006 | Kim et al. |
| 2002/0012495 A1 | 1/2002 | Sasai et al. | 2006/0094470 A1 | 5/2006 | Wake et al. ............... 455/562.1 |
| 2002/0048071 A1 | 4/2002 | Suzuki et al. | 2006/0104643 A1 | 5/2006 | Lee et al. |
| 2002/0075906 A1 | 6/2002 | Cole et al. .................. 370/535 | 2006/0159388 A1 | 7/2006 | Kawase et al. |
| 2002/0092347 A1 | 7/2002 | Niekirk et al. | 2006/0182446 A1 | 8/2006 | Kim et al. |
| 2002/0111149 A1 | 8/2002 | Shoki | 2006/0182449 A1 | 8/2006 | Iannelli et al. ............... 398/186 |
| 2002/0111192 A1 | 8/2002 | Thomas et al. | 2006/0189354 A1 | 8/2006 | Lee et al. ..................... 455/561 |
| 2002/0114038 A1 | 8/2002 | Arnon et al. | 2006/0233506 A1 | 10/2006 | Noonan et al. |
| 2002/0126967 A1 | 9/2002 | Panak et al. | 2006/0239630 A1 | 10/2006 | Hase et al. |
| 2002/0130778 A1 | 9/2002 | Nicholson | 2007/0009266 A1 | 1/2007 | Bothwell et al. |
| 2002/0181668 A1 | 12/2002 | Masoian et al. ............ 379/56.3 | 2007/0058978 A1 | 3/2007 | Lee et al. |
| 2002/0190845 A1 | 12/2002 | Moore ....................... 340/10.3 | 2007/0093273 A1 | 4/2007 | Cai |
| 2003/0007214 A1 | 1/2003 | Aburakawa et al. | 2007/0149250 A1 | 6/2007 | Crozzoli et al. |
| 2003/0016418 A1 | 1/2003 | Westbrook et al. | 2007/0166042 A1 | 7/2007 | Seeds et al. ................. 398/142 |
| 2003/0045284 A1 | 3/2003 | Copley et al. ............... 455/426 | 2007/0248358 A1 | 10/2007 | Sauer |
| 2003/0078074 A1 | 4/2003 | Sesay et al. | 2007/0253714 A1 | 11/2007 | Seeds et al. ................. 398/115 |
| 2003/0141962 A1 | 7/2003 | Barink .................... 340/10.42 | 2007/0274279 A1 | 11/2007 | Wood et al. |
| 2003/0161637 A1 | 8/2003 | Yamamoto et al. | 2008/0007453 A1 | 1/2008 | Vassilakis et al. |
| 2003/0165287 A1 | 9/2003 | Krill et al. | 2008/0013909 A1 | 1/2008 | Kostet et al. |

| | | | | | | |
|---|---|---|---|---|---|---|
| 2008/0013956 | A1 | 1/2008 | Ware et al. | JP | 2004-245963 | 9/2004 |
| 2008/0013957 | A1 | 1/2008 | Akers et al. | JP | 2004-247090 | 9/2004 |
| 2008/0014948 | A1 | 1/2008 | Scheinert | JP | 2004-264901 | 9/2004 |
| 2008/0026765 | A1 | 1/2008 | Charbonneau | JP | 2004-265624 | 9/2004 |
| 2008/0031628 | A1 | 2/2008 | Dragas et al. | JP | 2004-317737 | 11/2004 |
| 2008/0056167 | A1 | 3/2008 | Kim et al. | JP | 2004-349184 | 12/2004 |
| 2008/0058018 | A1 | 3/2008 | Scheinert | JP | 2005-018175 | 1/2005 |
| 2008/0119198 | A1 | 5/2008 | Hettstedt et al. | JP | 2005-087135 | 4/2005 |
| 2008/0124086 | A1 | 5/2008 | Matthews | JP | 2005-134125 | 5/2005 |
| 2008/0124087 | A1 | 5/2008 | Hartmann et al. | JP | 2007-228603 | 9/2007 |
| 2008/0145061 | A1 | 6/2008 | Lee et al. | JP | 2008-172597 | 7/2008 |
| 2008/0150514 | A1 | 6/2008 | Codreanu et al. | WO | 9810600 A1 | 3/1998 |
| 2008/0194226 | A1 | 8/2008 | Rivas et al. | WO | 0042721 A1 | 7/2000 |
| 2008/0212969 | A1 | 9/2008 | Fasshauer et al. | WO | WO 01/78434 A1 | 10/2001 |
| 2008/0219670 | A1 | 9/2008 | Kim et al. | WO | 0221183 A1 | 3/2002 |
| 2008/0232799 | A1 | 9/2008 | Kim | WO | WO0230141 A1 | 4/2002 |
| 2008/0247716 | A1 | 10/2008 | Thomas et al. | WO | WO02/102102 A1 | 12/2002 |
| 2008/0253773 | A1 | 10/2008 | Zheng | WO | 03024027 A1 | 3/2003 |
| 2008/0260388 | A1 | 10/2008 | Kim et al. | WO | WO03/098175 A1 | 11/2003 |
| 2008/0273844 | A1 | 11/2008 | Kewitsch | WO | WO2004/030154 A2 | 4/2004 |
| 2008/0298813 | A1 | 12/2008 | Song et al. | WO | WO2004/047472 A1 | 6/2004 |
| 2008/0304831 | A1 | 12/2008 | Miller, II et al. | WO | 2004059934 A1 | 7/2004 |
| 2008/0310848 | A1 | 12/2008 | Yasuda et al. | WO | WO2004/056019 A1 | 7/2004 |
| 2009/0041413 | A1 | 2/2009 | Hurley | WO | WO2004056019 A1 | 7/2004 |
| 2009/0047023 | A1 | 2/2009 | Pescod et al. | WO | WO2004/086795 A2 | 10/2004 |
| 2009/0061939 | A1 | 3/2009 | Andersson et al. | WO | WO2004/093471 A2 | 10/2004 |
| 2009/0135078 | A1 | 5/2009 | Lindmark et al. | WO | WO2004/093471 A3 | 10/2004 |
| 2009/0154621 | A1 | 6/2009 | Shapira et al. | WO | WO2005/062505 A1 | 7/2005 |
| | | | | WO | WO2005/069203 A2 | 7/2005 |

FOREIGN PATENT DOCUMENTS

| | | | | | |
|---|---|---|---|---|---|
| AU | 731180 | 3/1998 | WO | WO2005/073897 A1 | 8/2005 |
| CA | 2065090 C | 4/1992 | WO | WO2005/079386 A2 | 9/2005 |
| CA | 2242707 A1 | 1/1999 | WO | WO2005/101701 A2 | 10/2005 |
| DE | 20104862 U1 | 8/2001 | WO | WO2005/111959 A2 | 11/2005 |
| DE | 10249414 A1 | 5/2004 | WO | WO2006/011778 A1 | 2/2006 |
| EP | 0477952 A2 | 9/1991 | WO | WO2006/018592 A1 | 2/2006 |
| EP | 0477952 A3 | 9/1991 | WO | WO2006/018592 A1 | 2/2006 |
| EP | 0461583 B1 | 3/1997 | WO | WO2006/019392 A1 | 2/2006 |
| EP | 0687400 B1 | 11/1998 | WO | 2006039941 A1 | 4/2006 |
| EP | 0993124 A2 | 4/2000 | WO | 2006051262 A1 | 5/2006 |
| EP | 9003124 A3 | 4/2000 | WO | 2006133609 A1 | 12/2006 |
| EP | 1037411 A2 | 9/2000 | WO | WO2006/136811 A1 | 12/2006 |
| EP | 1267447 B1 | 1/2001 | WO | 2007048427 A1 | 5/2007 |
| EP | 1202475 A2 | 5/2002 | WO | WO2007/077451 A1 | 7/2007 |
| EP | 1363352 A1 | 11/2003 | WO | 2007088561 A1 | 8/2007 |
| EP | 1391897 A1 | 2/2004 | WO | WO2007/091026 A1 | 8/2007 |
| EP | 1443687 A1 | 8/2004 | WO | 2008008249 A2 | 1/2008 |
| EP | 1455550 A2 | 9/2004 | WO | 2008027213 A2 | 3/2008 |
| EP | 1501206 A1 | 1/2005 | WO | 2008039830 A1 | 4/2008 |
| EP | 1503451 A1 | 2/2005 | WO | 2006046088 A1 | 5/2009 |
| EP | 1530316 A1 | 5/2005 | | | |
| EP | 1511203 B1 | 3/2006 | | | |
| EP | 1693974 A1 | 8/2006 | | | |
| EP | 1742388 A1 | 1/2007 | | | |
| EP | 1227605 B1 | 1/2008 | | | |
| EP | 1968250 A1 | 9/2008 | | | |
| EP | 1056226 B1 | 4/2009 | | | |
| EP | 1357683 B1 | 5/2009 | | | |
| GB | 2323252 A | 9/1998 | | | |
| GB | 2399963 A | 9/2004 | | | |
| GB | 2428149 A | 1/2007 | | | |
| JP | 5260018 A | 8/1993 | | | |
| JP | 083450 A | 3/1997 | | | |
| JP | 9162810 A | 6/1997 | | | |
| JP | 09-200840 | 7/1997 | | | |
| JP | 1168675 A | 3/1999 | | | |
| JP | 2000-152300 | 5/2000 | | | |
| JP | 2000-341744 | 8/2000 | | | |
| JP | 2002-264617 | 9/2002 | | | |
| JP | 2003-148653 | 5/2003 | | | |
| JP | 2003-172827 | 6/2003 | | | |
| JP | 2004-172734 | 6/2004 | | | |

OTHER PUBLICATIONS

Bakaul, M. et al., "Efficient Multiplexing Scheme for Wavelength-Interleaved DWDM Millimeter-Wave Fiber-Radio Systems," IEEE Photonics Technology Letters, vol. 17, No. 12, Dec. 2005.

D. Huang, C. Chiu, "A WLAN-Used Helical Antenna Fully Integrated with the PCMCIA Carrier," IEEE Trans. Ant. and Prop., vol. 53, No. 12, pp. 4164-4168, Dec. 2005.

Gibson et al., "Evanescent Field Analysis of Air-Silica Microstructure Waveguides," IEEE, 1-7803-7104-4/01, 2001, pp. 709-710.

ITU-T G.652, Telecommunication Standardization Sector of ITU, Jun. 2005, Series G: Transmission Systems and Media, Digital Systems and Networks, Transmission Media and Optical Systems Characteristics—Optical Fiber Cables, Characteristics of a Single-Mode Optical Fiber and Cable, ITU-T Recommendation G.652, 22 pages.

ITU-T G.657, Telecommunication Standardization Sector of ITU, Dec. 2006, Series G: Transmission Systems and Media, Digital Systems and Networks, Transmission Media and Optical Systems Characteristics—Optical Fibrer Cables, Characteristics of a Bending Loss Insensitive Single Mode Optical Fiber and Cable for the Access Network, ITU-T Recommendation G.657, 20 pages.

Kojucharow, K. et al., "Millimeter-Wave Signal Properties Resulting from Electrooptical Upconversion," IEEE Transaction on Microwave Theory and Techniques, vol. 49, No. 10, Oct. 2001, pp. 1977-1985.

Monro et al., "Holey Fibers with Random Cladding Distributions," Optics Letters, vol. 25, No. 4, Feb. 15, 2000.

Moreira, J.D. et al., "Diversity Techniques for OFDM Based WLAN Systems," pp. 1008-1011, PIMRC 2002 IEEE.

Niiho, T. et al., "Multi-Channel Wireless LAN Distributed Antenna System Based on Radio-Over-Fiber Techniques," Lasers and Electro-Optics Society 2004, LEOS 2004, The 17th Annual Meeting of the IEEE, vol. 1, Nov. 7-11, 2004, pp. 57-58.

Paulraj, A. et al., "An Overview of MIMO Communications—A Key to Gigabit Wireless," Proceedings of the IEEE, vol. 92, No. 2, Feb. 2004.

Pickrell et al., "Novel Techniques for the Fabrication of Holey Optical Fibers," Spie Conference Proceedings, vol. 4578, pp. 271-282, 2001.

Roh, W. and Paulraj, A., "MIMO Channel Capacity for the Distributed Antenna Systems," Vehicular Technology Conference, 2002, proceedings, VTC 2002-Fall, 2002 IEEE 56th, vol. 2, Sep. 24-28, 2002, pp. 706-709.

Shen, C., Zhou, S., and Yao, Y., "Comparison of Channel Capacity for MIMO-DAS versus MIMO-CAS," Communications, 2003, APCC 2003, The 9th Asia-Pacific Conference, vol. 1, Sep. 21-24, 2003, pp. 113-118.

International application published under the Patent Cooperation Treaty; International Publication No. WO 2008/033298 A3; Mar. 20, 2008; 2 pages.

Winters, J., Salz J., and Gitlin, R., "The Impact of Antenna Diversity on the Capacity of Wireless Communication Systems", IEEE Transactions on Communications, vol. 42, No. 2/3/4, Feb./Mar./Apr. 1994.

Cooper, A.J., "Fiber/Radio" for the Provision of Cordless/Mobile Telephony Services in the Access Network, Electronics Letters, Nov. 22, 1990, vol. 26, No. 24, pp. 2054-2056.

Opatic, D., "Radio over Fiber Technology for Wireless Access," Oct. 17, 2009, 6 pages.

\* cited by examiner

RADIO-OVER-FIBER (ROF) OPTICAL FIBER CABLE SYSTEM WITH TRANSPONDER DIVERSITY AND ROF WIRELESS PICOCELLULAR SYSTEM USING SAME

BACKGROUND OF THE INVENTION

1. Field of the Invention

The present invention relates generally to wireless communication systems, and in particular relates to centralized optical-fiber-based wireless systems and methods employing radio-frequency (RF) transmission over optical fiber.

2. Technical Background

Wireless communication is rapidly growing, with ever-increasing demands for high-speed mobile data communication. As an example, so-called "wireless fidelity" or "WiFi" systems and wireless local area networks (WLANs) are being deployed in many different types of areas (coffee shops, airports, libraries, etc.). Wireless communication systems communicate with wireless devices called "clients," which must reside within the wireless range or "cell coverage area" in order to communicate with the access point device.

One approach to deploying a wireless communication system involves the use of "picocells," which are radio-frequency (RF) coverage areas having a radius in the range from about a few meters up to about 20 meters. Because a picocell covers a small area, there are typically only a few users (clients) per picocell. Picocells also allow for selective wireless coverage in small regions that otherwise would have poor signal strength when covered by larger cells created by conventional base stations.

In conventional wireless systems, picocells are created by and centered on a wireless access point device connected to a head-end controller. The wireless access point device includes digital information processing electronics, a RF transmitter/receiver, and an antenna operably connected to the RF transmitter/receiver. The size of a given picocell is determined by the amount of RF power transmitted by the access point device, the receiver sensitivity, antenna gain and the RF environment, as well as by the RF transmitter/receiver sensitivity of the wireless client device. Client devices usually have a fixed RF receiver sensitivity, so that the above-mentioned properties of the access point device mainly determine the picocell size. Combining a number of access point devices connected to the head-end controller creates an array of picocells that cover an area called a "picocellular coverage area." A closely packed picocellular array provides high per-user data-throughput over the picocellular coverage area.

Prior art wireless systems and networks are wire-based signal distribution systems where the access point devices are treated as separate processing units linked to a central location. This makes the wireless system/network relatively complex and difficult to scale, particularly when many picocells need to cover a large region. Further, the digital information processing performed at the access point devices requires that these devices be activated and controlled by the head-end controller, which further complicates the distribution and use of numerous access point devices to produce a large picocellular coverage area.

One application of picocellular wireless systems involves providing a number of different services (e.g., WLAN, voice, RFID tracking, temperature and/or light control) within a building, usually by deploying one or more optical fiber cables close to the ceiling. A problem with such cable installation is the chance of one or more transponders being obstructed by a portion of the building structure, such as metallic framework of a drop-down ceiling. The effect of such an obstruction degrades the radiation characteristics of the antenna, which reduces the ability of the picocell to properly function.

Another problem is the multi-path (fading) nature of signal propagation in indoor wireless environments. This simply means that local maximas and minimas of desired signals can exist over a picocell coverage area A receiver antenna located at a maximum location will have better performance than a receiver antenna located in a minimum position.

SUMMARY OF THE INVENTION

One aspect of the invention is a radio-over-fiber (RoF) optical fiber cable system with transponder diversity for a RoF wireless picocellular system. The system includes at least one optical fiber cable and two or more transponders optically supported by the at least one optical fiber cable. The two or more transponders are arranged to form one or more groups of two or more proximately located transponders. The transponders in a given transponder group are adapted to form corresponding two or more substantially co-located picocells. The system also includes a diversity combiner optically coupled to each transponder. The diversity combiner is adapted to determine respective signal strengths from each transponder in each transponder group to ensure the transponder with the greatest signal strength in a given transponder group is used to form the picocell for the given group.

Another aspect of the invention is a RoF wireless picocellular system. The system includes one or more RoF optical fiber cables adapted to operably support, either individually or collectively, one or more transponder groups each having two or more transponders. Each transponder is adapted to form a picocell substantially co-located with picocells formed by the other transponders in the corresponding transponder group. The system also includes a central head-end station optically coupled to the one or more RoF optical fiber cables. The central head-end station is adapted to provide downlink optical signals to each transponder and receive uplink optical signals from each transponder. The system further includes a diversity combiner operably coupled to or included in the central head-end station. The diversity combiner is adapted to receive uplink signals from each transponder to determine relative uplink signal strengths from each transponder in each transponder group, including a greatest uplink signal strength. The central head-end station then provides the downlink optical signals to the transponder in each transponder group having the greatest uplink signal strength.

Another aspect of the invention is a method of providing transponder diversity in a RoF wireless picocellular system. The method includes optically supporting in one or more RoF optical fiber cables one or more transponder groups each having two or more transponders, wherein the transponders in each transponder group are arranged to form substantially co-located picocells. The method also includes determining whether a transponder in a given transponder group has a greater signal strength than the other transponders in the group. The method further includes addressing the transponder having the greater signal strength.

Additional features and advantages of the invention are set forth in the detailed description that follows, and will be readily apparent to those skilled in the art from that description or recognized by practicing the invention as described herein, including the detailed description that follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

Accordingly, various basic electronic circuit elements and signal-conditioning components, such as bias tees, RF filters, amplifiers, power dividers, etc., are not all shown in the Figures for ease of explanation and illustration. The application of such basic electronic circuit elements and components to the systems of the present invention will be apparent to one skilled in the art.

DETAILED DESCRIPTION OF THE PREFERRED EMBODIMENTS

Reference is now made in detail to the present preferred embodiments of the invention, examples of which are illustrated in the accompanying drawings. Whenever possible, the same or analogous reference numbers are used throughout the drawings to refer to the same or like parts.

Generalized Optical-Fiber-Based Wireless System

Figure 1:
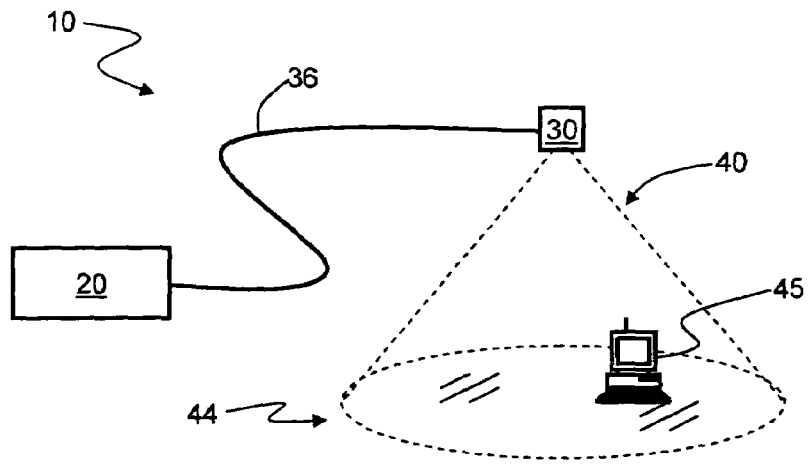
FIG. 1 is a schematic diagram of a generalized embodiment of an optical-fiber-based wireless picocellular system according to the present invention showing a head-end unit optically coupled to a transponder via an optical fiber RF communication link, along with the picocell formed by the transponder and a client device within the picocell.

FIG. 1 is a schematic diagram of a generalized embodiment of an optical-fiber-based wireless picocellular system 10 according to the present invention. System 10 includes a head-end unit 20, one or more transponder units ("transponder") 30 and an optical fiber RF communication link 36 that optically couples the head-end unit to the transponder. As discussed in detail below, system 10 has a picocell 40 substantially centered about transponder 30. The one or more transponders 30 form a picocellular coverage area 44. Head-end unit 20 is adapted to perform or to facilitate any one of a number of RF-over-fiber applications, such as radio-frequency identification (RFID), wireless local-area network (WLAN) communication, or cellular phone service. Shown within picocell 40 is a client device 45 in the form of a computer. Client device 45 includes an antenna 46 (e.g., a wireless card) adapted to receive and/or send electromagnetic RF signals.

Figure 2:
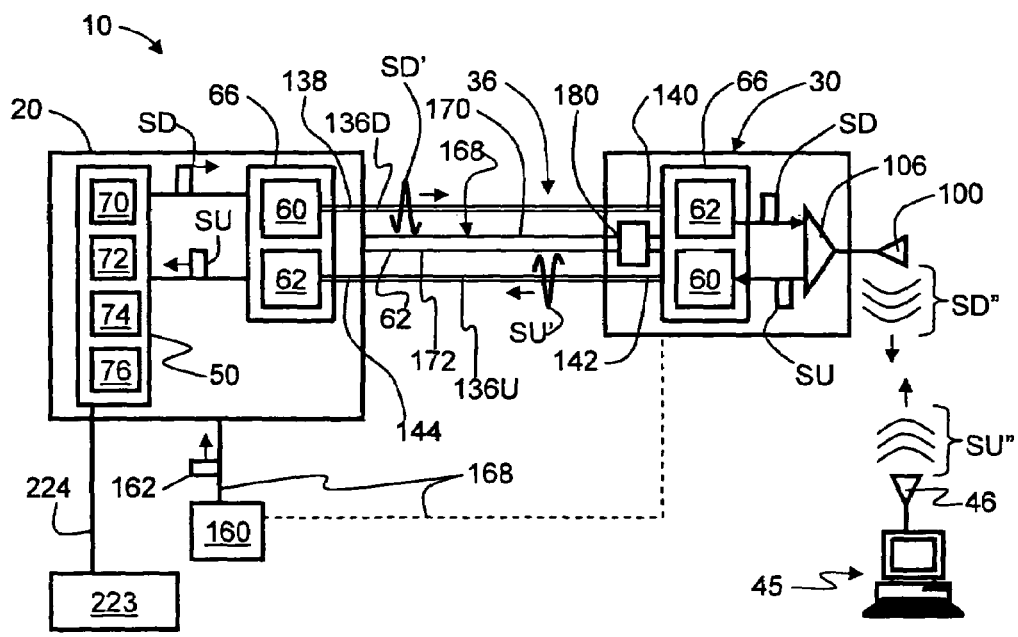
FIG. 2 is a detailed schematic diagram of an example embodiment of the system of FIG. 1, showing the details of the head-end unit, the optical fiber RF communication link and the transponder.

FIG. 2 is a detailed schematic diagram of an example embodiment of system 10 of FIG. 1. In an example embodiment, head-end unit 20 includes a service unit 50 that provides electrical RF service signals for a particular wireless service or application. In an example embodiment, service unit 50 provides electrical RF service signals by passing (or conditioning and then passing) such signals from one or more outside networks 223, as described below. In a particular example embodiment, this includes providing WLAN signal distribution as specified in the IEEE 802.11 standard, i.e., in the frequency range from 2.4 to 2.5 GHz and from 5.0 to 6.0 GHz. In another example embodiment, service unit 50 provides electrical RF service signals by generating the signals directly. In another example embodiment, service unit 50 coordinates the delivery of the electrical RF service signals between client devices within picocellular coverage area 44.

Service unit 50 is electrically coupled to an electrical-to-optical (E/O) converter 60 that receives an electrical RF service signal from the service unit and converts it to corresponding optical signal, as discussed in greater detail below. In an example embodiment, E/O converter 60 includes a laser suitable for delivering sufficient dynamic range for the RF-over-fiber applications of the present invention, and optionally includes a laser driver/amplifier electrically coupled to the laser. Examples of suitable lasers for E/O converter 60 include laser diodes, distributed feedback (DFB) lasers, Fabry-Perot (FP) lasers, and vertical cavity surface emitting lasers (VCSELs).

Head-end unit 20 also includes an optical-to-electrical (O/E) converter 62 electrically coupled to service unit 50. O/E converter 62 receives an optical RF service signal and converts it to a corresponding electrical signal. In an example embodiment, O/E converter is a photodetector, or a photodetector electrically coupled to a linear amplifier. E/O converter 60 and O/E converter 62 constitute a "converter pair" 66.

In an example embodiment, service unit 50 includes a RF signal modulator/demodulator unit 70 for modulating/demodulating RF signals, a digital signal processing unit ("digital signal processor") 72, a central processing unit (CPU) 74 for processing data and otherwise performing logic and computing operations, and a memory unit 76 for storing data, such as RFID tag information or data to be transmitted over the WLAN.

With continuing reference to FIG. 2, in an example embodiment transponder 30 includes a converter pair 66, wherein the E/O converter 60 and the O/E converter 62 therein are electrically coupled to an antenna system 100 via a RF signal-directing element 106, such as a circulator. Signal-directing element 106 serves to direct the downlink and uplink electrical RF service signals, as discussed below. In an example embodiment, antenna system 100 includes one or more patch antennas, such as disclosed in U.S. patent application Ser. No. 11/504,999 filed Aug. 16, 2006 and U.S. patent application Ser. No. 11/451,553 filed Jun. 12, 2006, which patent applications are incorporated herein by reference in their entirety.

Figure 3:
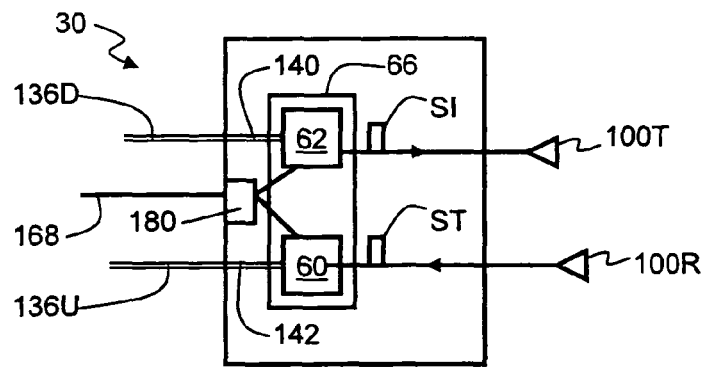
FIG. 3 is a close-up view of an alternative example embodiment for the transponder of the wireless system of FIG. 2, wherein the transponder includes a transmitting antenna and a receiving antenna.

FIG. 3 is a close-up view of an alternative example embodiment for transponder 30 that includes two antennae: a transmitting antenna 100T electrically coupled to O/E converter 62, and a receiving antenna 100R electrically coupled to O/E converter 60. The two-antenna embodiment obviates the need for RF signal-directing element 106.

Transponders 30 of the present invention differ from the typical access point device associated with wireless communication systems in that the preferred embodiment of the transponder has just a few signal-conditioning elements and no digital information processing capability. Rather, the information processing capability is located remotely in head-end unit 20, and in a particular example, in service unit 50. This allows transponder 30 to be very compact and virtually maintenance free. In addition, the preferred example embodiment of transponder 30 consumes very little power, is transparent to RF signals, and does not require a local power source, as described below.

With reference again to FIG. 2, an example embodiment of optical fiber RF communication link 36 includes a downlink optical fiber 136D having an input end 138 and an output end 140, and an uplink optical fiber 136U having an input end 142 and an output end 144. The downlink and uplink optical fibers 136D and 136U optically couple converter pair 66 at head-end unit 20 to the converter pair at transponder 30. Specifically, downlink optical fiber input end 138 is optically coupled to E/O converter 60 of head-end unit 20, while output end 140 is optically coupled to O/E converter 62 at transponder 30. Similarly, uplink optical fiber input end 142 is optically coupled to E/O converter 60 of transponder 30, while output end 144 is optically coupled to O/E converter 62 at head-end unit 20.

In an example embodiment, the optical-fiber-based wireless picocellular system 10 of the present invention employs a known telecommunications wavelength, such as 850 nm, 1300 nm, or 1550 nm. In another example embodiment, system 10 employs other less common but suitable wavelengths such as 980 nm.

Example embodiments of system 10 include either single-mode optical fiber or multimode optical fiber for downlink and uplink optical fibers 136D and 136U. The particular type of optical fiber depends on the application of system 10. For many in-building deployment applications, maximum transmission distances typically do not exceed 300 meters. The maximum length for the intended RF-over-fiber transmission needs to be taken into account when considering using multi-mode optical fibers for downlink and uplink optical fibers 136D and 136U. For example, it has been shown that a 1400 MHz.km multi-mode fiber bandwidth-distance product is sufficient for 5.2 GHz transmission up to 300 m.

In an example embodiment, the present invention employs 50 µm multi-mode optical fiber for the downlink and uplink optical fibers 136D and 136U, and E/O converters 60 that operate at 850 nm using commercially available VCSELs specified for 10 Gb/s data transmission. In a more specific example embodiment, OM3 50 µm multi-mode optical fiber is used for the downlink and uplink optical fibers 136D and 136U.

Wireless system 10 also includes a power supply 160 that generates an electrical power signal 162. Power supply 160 is electrically coupled to head-end unit 20 for powering the power-consuming elements therein. In an example embodiment, an electrical power line 168 runs through the head-end unit and over to transponder 30 to power E/O converter 60 and O/E converter 62 in converter pair 66, the optional RF signal-directing element 106 (unless element 106 is a passive device such as a circulator), and any other power-consuming elements (not shown). In an example embodiment, electrical power line 168 includes two wires 170 and 172 that carry a single voltage and that are electrically coupled to a DC power converter 180 at transponder 30. DC power converter 180 is electrically coupled to E/O converter 60 and O/E converter 62, and changes the voltage or levels of electrical power signal 162 to the power level(s) required by the power-consuming components in transponder 30. In an example embodiment, DC power converter 180 is either a DC/DC power converter, or an AC/DC power converter, depending on the type of power signal 162 carried by electrical power line 168. In an example embodiment, electrical power line 168 includes standard electrical-power-carrying electrical wire(s), e.g., 18-26 AWG (American Wire Gauge) used in standard telecommunications and other applications. In another example embodiment, electrical power line 168 (dashed line) runs directly from power supply 160 to transponder 30 rather than from or through head-end unit 20. In another example embodiment, electrical power line 168 includes more than two wires and carries multiple voltages.

In an example embodiment, head-end unit 20 is operably coupled to an outside network 223 via a network link 224.

Method of Operation

With reference to the optical-fiber-based wireless picocellular system 10 of FIG. 1 and FIG. 2, service unit 50 generates an electrical downlink RF service signal SD ("electrical signal SD") corresponding to its particular application. In an example embodiment, this is accomplished by digital signal processor 72 providing the RF signal modulator 70 with an electrical signal (not shown) that is modulated onto a RF carrier to generate a desired electrical signal SD.

Electrical signal SD is received by E/O converter 60, which converts this electrical signal into a corresponding optical downlink RF signal SD' ("optical signal SD'"), which is then coupled into downlink optical fiber 136D at input end 138. It is noted here that in an example embodiment optical signal SD' is tailored to have a given modulation index. Further, in an example embodiment the modulation power of E/O converter 60 is controlled (e.g., by one or more gain-control amplifiers, not shown) to vary the transmission power from antenna system 100. In an example embodiment, the amount of power provided to antenna system 100 is varied to define the size of the associated picocell 40, which in example embodiments range anywhere from about a meter across to about twenty meters across.

Optical signal SD' travels over downlink optical fiber 136 to output end 140, where it is received by O/E converter 62 in transponder 30. O/E converter 62 converts optical signal SD' back into electrical signal SD, which then travels to signal-directing element 106. Signal-directing element 106 then directs electrical signal SD to antenna 100. Electrical signal SD is fed to antenna system 100, causing it to radiate a corresponding electromagnetic downlink RF signal SD'' ("electromagnetic signal SD''").

Because client device 45 is within picocell 40, electromagnetic signal SD'' is received by client device antenna 46, which may be part of a wireless card, or a cell phone antenna, for example. Antenna 46 converts electromagnetic signal SD'' into electrical signal SD in the client device (signal SD is not shown therein). Client device 45 then processes electrical signal SD, e.g., stores the signal information in memory, displays the information as an e-mail or text message, etc.

In an example embodiment, client device 45 generates an electrical uplink RF signal SU (not shown in the client device), which is converted into an electromagnetic uplink RF signal SU'' (electromagnetic signal SU''") by antenna 46.

Because client device 45 is located within picocell 40, electromagnetic signal SU'' is detected by transponder antenna system 100, which converts this signal back into electrical signal SU. Electrical signal SU is directed by signal-directing element 106 to E/O converter 60, which converts this electrical signal into a corresponding optical uplink RF signal SU' ("optical signal SU'"), which is then coupled into input end 142 of uplink optical fiber 136U. Optical signal SU' travels over uplink optical fiber 136U to output end 144, where it is received by O/E converter 62 at head-end unit 20. O/E converter 62 converts optical signal SU' back into electrical signal SU, which is then directed to service unit 50. Service unit 50 receives and processes signal SU, which in an example embodiment includes one or more of the following: storing the signal information; digitally processing or conditioning the signals; sending the signals on to one or more outside networks 223 via network links 224; and sending the signals to one or more client devices 45 in picocellular coverage area 44. In an example embodiment, the processing of signal SU includes demodulating this electrical signal in RF signal modulator/demodulator unit 70, and then processing the demodulated signal in digital signal processor 72.

System with Central Head-End Station and Optical Fiber Cable

Figure 4:
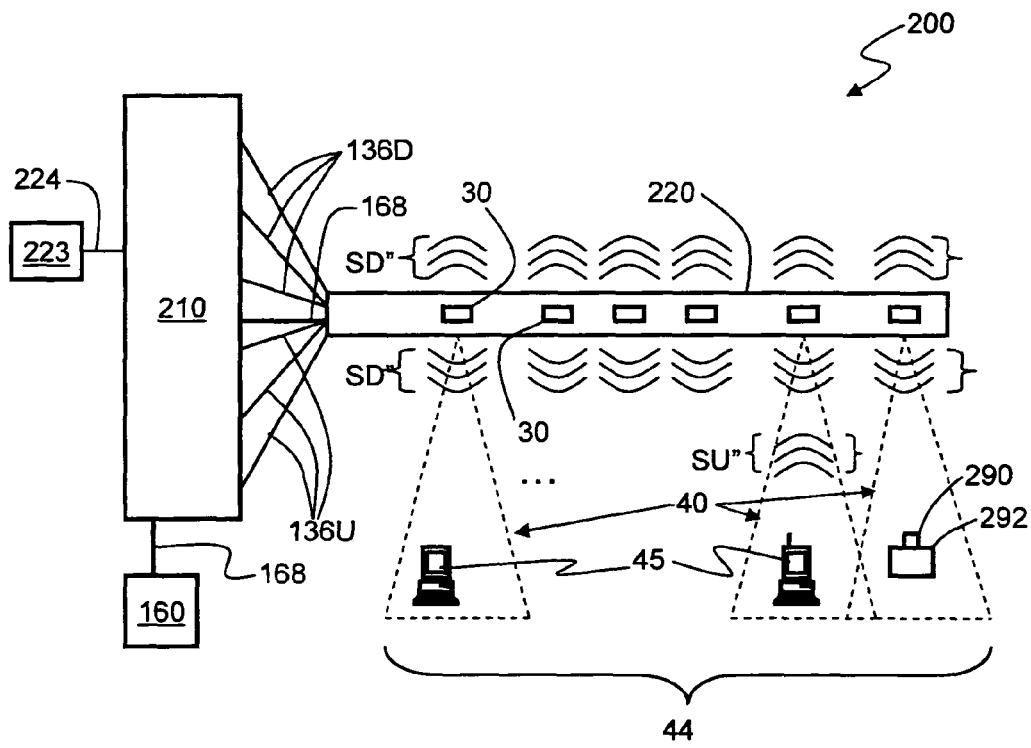
FIG. 4 is a schematic diagram of an example embodiment of an optical-fiber-based wireless picocellular system according to the present invention that utilizes a central head-end station and multiple transponders arranged along an optical fiber cable.

FIG. 4 is a schematic diagram of an example embodiment of an optical-fiber-based wireless picocellular system 200 that includes a central head-end station 210. Central head-end station 210 can be thought of as a modified head-end unit 20 adapted to handle multiple service units 50 and multiple transponders 30. Central head-end station 210 is optically coupled to an optical fiber cable 220 that includes multiple transponders 30. Optical fiber cable 220 is constituted by multiple optical fiber RF communication links 36, with each link optically coupled to a corresponding transponder 30. In an example embodiment, multiple transponders 30 are spaced apart along the length of optical fiber cable 220 (e.g., at 8 meter intervals) to create a desired picocell coverage area 44 made up of picocells 40, which in practice overlap at the edges.

Figure 5:
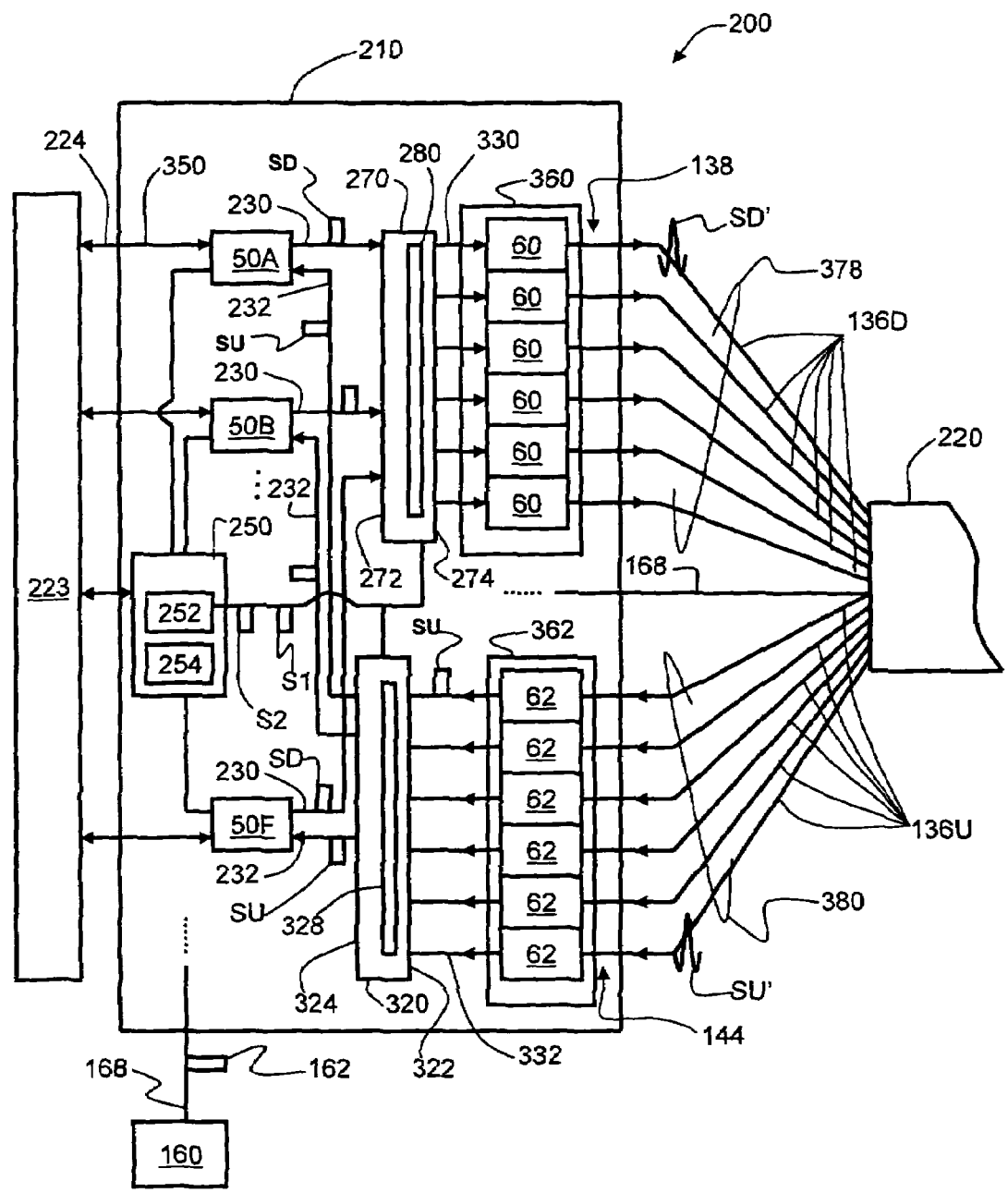
FIG. 5 is a detailed schematic diagram of an example embodiment of the central head-end station of the system of FIG. 4.

FIG. 5 is a detailed schematic diagram of an example embodiment of central head-end control station 210. Rather than including multiple head-end units 20 of FIG. 1 directly into head-end control station 210, in an example embodiment the head-end units are modified to allow for each service unit 50 to communicate with one, some, or all of transponders 30, depending on the particular application of a given service unit. Service units 50 are each electrically coupled to a RF transmission line 230 and a RF receiving line 232. In FIG. 5, three of six service units 50A through 50F are shown for the sake of illustration.

In an example embodiment, system 200 further includes a main controller 250 operably coupled to service units 50 and adapted to control and coordinate the operation of the service units in communicating with transponders 30. In an example embodiment, controller 250 includes a central processing unit (CPU) 252 and a memory unit 254 for storing data. CPU 252 is adapted (e.g., is programmed) to process information provided to controller 250 by one or more of service units 50.

In an example embodiment, controller 250 is or includes a programmable computer adapted to carry out instructions (programs) provided to it or otherwise encoded therein on a computer-readable medium.

Central head-end station 210 further includes a downlink RF signal multiplexer ("downlink multiplexer") 270 operably coupled to controller 250. Downlink multiplexer unit 270 has an input side 272 and an output side 274. Transmission lines 230 are electrically connected to downlink multiplexer 270 at input side 272.

In an example embodiment, downlink multiplexer 270 includes a RF signal-directing element 280 (e.g., a RF switch) that allows for selective communication between service units 50 and transponders 30, as described below. In an example, the selective communication involves sequentially addressing transponders 30 for polling corresponding picocells 40. Such sequential polling can be used, for example, when one of service units 50 is a RFID reader searching for RFID tags 290 in picocells 40 (FIG. 4). In an example embodiment, RFID tags 290 are attached to an item 292 to be tracked or otherwise monitored via the attached RFID tag. In another example embodiment, the selective communication involves simultaneously addressing some or all of transponders 30. Such simultaneous addressing can be used, for example, when one of service units 50 is a cellular phone transmitter or a RF-signal feed-through unit that provides simultaneous coverage of some or all of picocells 40.

Central head-end station 210 also includes an uplink RF signal multiplexer ("uplink multiplexer") 320 operably coupled to controller 250 and having an input side 322 and an output side 324. Receiving lines 232 are electrically connected to uplink multiplexer 320 at output side 324. In an example embodiment, uplink multiplexer 320 includes a RF signal-directing element 328.

Central head-end station 210 also includes a number of E/O converters 60 that make up an E/O converter array 360, and a corresponding number of O/E converters 62 that make up an O/E converter array 362. E/O converters 60 are electrically coupled to output side 274 of downlink multiplexer 270 via electrical lines 330, and are optically coupled to input ends 138 of corresponding downlink optical fibers 136D. O/E converters 62 are electrically coupled to input side 322 of uplink multiplexer 320 via electrical lines 332, and are optically coupled to output ends 144 of corresponding uplink optical fiber 136U. Downlink optical fibers 136D constitute a downlink optical fiber cable 378 and uplink optical fibers 136U constitute an uplink optical fiber cable 380.

Figure 6A:
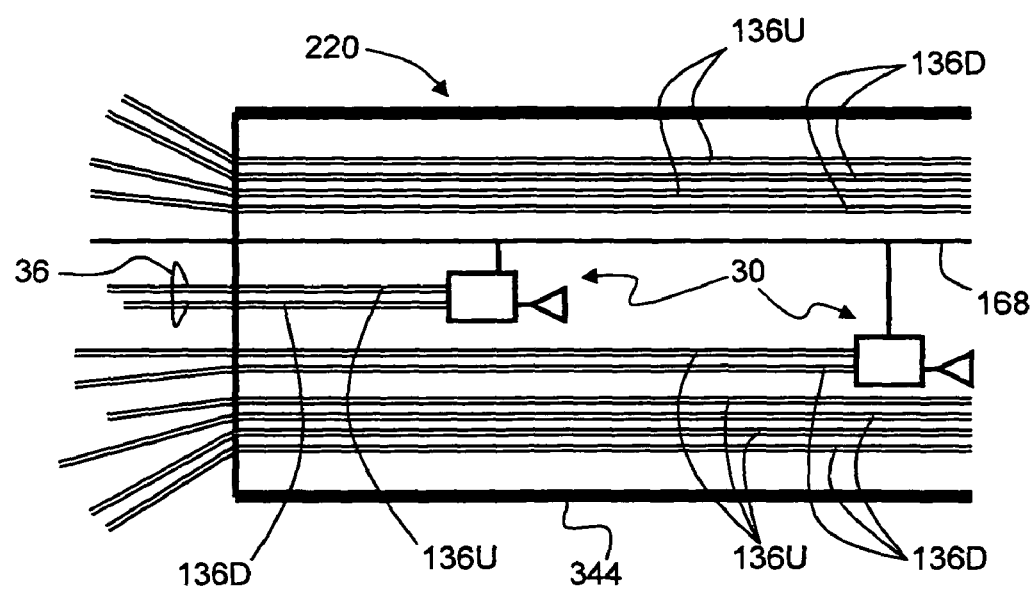
FIG. 6A is a close-up cut-away view of the optical fiber cable of the system of FIG. 4, showing two transponders, the downlink and uplink optical fibers, and the electrical power line that powers the transponders.

FIG. 6A is a close-up schematic diagram of optical fiber cable 220 showing downlink and uplink optical fibers 136D and 136U and two of the six transponders 30. Also shown is electrical power line 168 electrically coupled to transponders 30. In an example embodiment, optical fiber cable 220 includes a protective outer jacket 344. In an example embodiment, transponders 30 reside completely within out jacket 344.

Figure 6B:
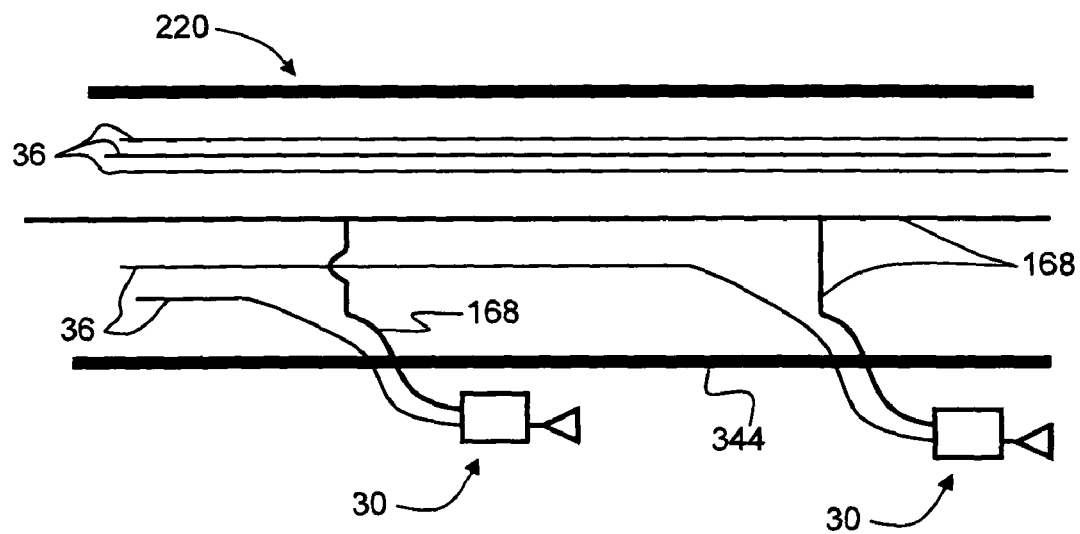
FIG. 6B is a schematic diagram similar to FIG. 6A, illustrating an example embodiment wherein transponders lie outside of the protective outer jacket of the optical fiber cable.

FIG. 6B is a schematic diagram similar to FIG. 6A, illustrating an example embodiment wherein transponders 30 lie outside of protective outer jacket 344. Having transponders 30 lie outside of protective outer jacket 344 makes it easier to arrange the transponders relative to a building infrastructure after the optical fiber cable is deployed, as described below.

Method of Operation

With reference to FIGS. 4, 5, 6A and 6B, optical-fiber-based wireless picocellular system 200 operates as follows. At central head-end station 210, service units 50A, 50B, . . . 5OF each generate or pass through from one or more outside networks 223 respective electrical signals SD that correspond to the particular application of the given service unit. Electrical signals SD are transmitted over RF transmission lines 230 to downlink multiplexer 270. Downlink multiplexer 270 then combines (in frequency) and distributes the various signals SD to E/O converters 60 in E/O converter array 360. In an example embodiment, downlink multiplexer 270 and RF signal-directing element 280 therein are controlled by controller 250 via a control signal S1 to direct signals SD to one, some or all of E/O converters 60 in E/O converter array 360 and thus to one, some or all of transponders 30, based on the particular service unit application. For example, if service unit 50A is a cellular phone unit, then in an example embodiment signals SD therefrom (e.g., passing therethrough from one or more outside networks 223) are divided (and optionally amplified) equally by RF signal-directing element 280 and provided to each E/O converter 60 in E/O converter array 360. This results in each transponder 30 being addressed. On the other hand, if service unit 50F is a WLAN service unit, then RF signal-directing element 280 may be adapted (e.g., programmed) to direct signals SD to select ones of E/O converters 60 in E/O converter array 360 so that only select transponders 30 are addressed.

Thus, one, some or all of E/O converters 60 in E/O converter array 360 receive electrical signals SD from downlink multiplexer 270. The addressed E/O converters 60 in E/O converter array 360 convert electrical signals SD into corresponding optical signals SD', which are transmitted over the corresponding downlink optical fibers 136D to the corresponding transponders 30. The addressed transponders 30 convert optical signals SD' back into electrical signals SD, which are then converted into electromagnetic signals SD" that correspond to the particular service unit application.

Figure 7:
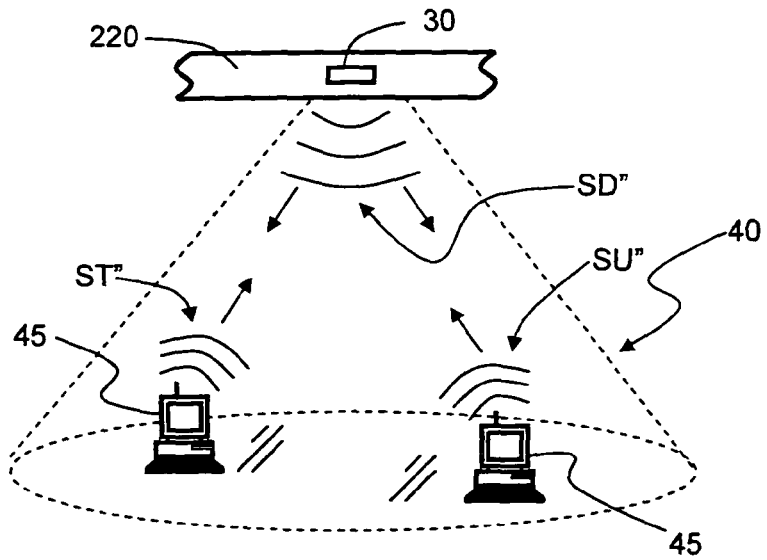
FIG. 7 is a close-up view of one of the transponders in the optical fiber cable, illustrating the corresponding picocell and the exchange of electromagnetic RF service signals between the transponder and client devices within the picocell.

FIG. 7 is a close-up view of one of transponders 30 in optical fiber cable 220, illustrating the corresponding picocell 40 and the exchange of downlink and uplink electromagnetic signals SD" and SU" between the transponder and client devices 45 within the picocell. In particular, electromagnetic signals SU" are received by the corresponding transponder 30 and converted to electrical signals SU, and then to optical signals SD'. Optical signals SD' then travel over uplink optical fiber 136U and are received by O/E converter array 362 and the corresponding O/E converters 62 therein for the addressed transponders 30. The O/E converters 60 convert optical signals SU' back to electrical signals SU, which then proceed to uplink multiplexer 320. Uplink multiplexer 320 then distributes electrical signals SU to the service unit(s) 50 that require(s) receiving these electrical signals. The receiving service units 50 process signals SU, which in an example embodiment includes one or more of: storing the signal information; digitally processing or conditioning the signals; sending the signals on to one or more outside networks 223 via network links 224; and sending the signals to one or more client devices 45 in picocellular coverage area 44.

In an example embodiment, uplink multiplexer 320 and RF signal-directing element 328 therein are controlled by controller 250 via a control signal S2 to direct electrical signals SU to the service unit(s) 50 that require(s) receiving electrical signals SU.

In an example embodiment, the different services from some or all of service units 50 (i.e. cellular phone service, WiFi for data communication, RFID monitoring, etc.) are combined at the RF signal level by frequency multiplexing.

In an example embodiment, a single electrical power line 168 from power supply 160 at central control station 210 is incorporated into optical fiber cable 220 and is adapted to power each transponder 30, as shown in FIG. 6. Each transponder 30 taps off the needed amount of power, e.g., via DC converter 180 (FIG. 2). Since the preferred embodiment of transponder 30 has relatively low functionality and power consumption, only relatively low electrical power levels are required (e.g., ~1 watt), allowing high-gauge wires to be used (e.g., 20 AWG or higher) for electrical power line 168. In an example embodiment that uses many transponders 30 (e.g., more than 12) in optical fiber cable 220, or if the power consumption for transponders 30 is significantly larger than 1 watt due to their particular design, lower-gauge wires or multiple wires are employed in electrical power line 168. The inevitable voltage drop along electrical power line 168 within cable 220 typically requires large-range (~30 volts) voltage regulation at each transponder 30. In an example embodiment, DC power converters 180 at each transponder 30 perform this voltage regulation function. If the expected voltage drop is known, then in an example embodiment controller 250 carries out the voltage regulation. In an alternative embodiment, remote voltage sensing at each transponder 30 is used, but this approach is not the preferred one because it adds complexity to the system.

Centralized System with Multiple Optical Fiber Cables

Figure 8:
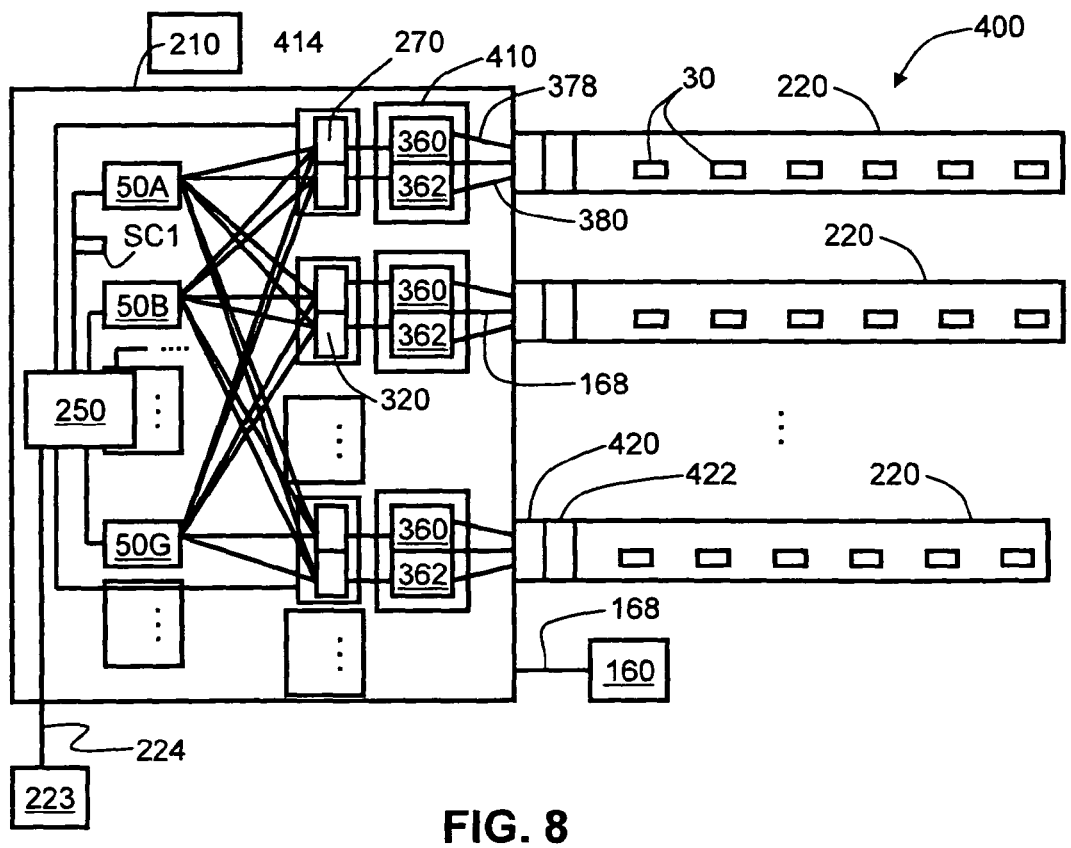
FIG. 8 is a schematic diagram of an example embodiment of an optical-fiber-based picocellular system that includes a central head-end station and multiple optical fiber cables.

FIG. 8 is a schematic diagram of an example embodiment of a centralized optical-fiber-based wireless picocellular system 400 according the present invention. System 400 is similar to system 200 as described above, but includes multiple optical fiber cables 220 optically coupled to central head-end station 210. Central head-end station 210 includes a number of E/O converter arrays 360 and a corresponding number of O/E converter arrays 362, arranged in pairs in converter array units 410, with one converter array unit optically coupled to one optical fiber cable 220. Likewise, system 400 includes a number of downlink multiplexers 270 and uplink multiplexers 320, arranged in pairs in multiplexer units 414, with one multiplexer unit electrically coupled to one converter array unit 410. In an example embodiment, controller 250 is electrically coupled to each multiplexer unit 414 and is adapted to control the operation of the downlink and uplink multiplexers 270 and 320 therein. Here, the term "array" is not intended to be limited to components integrated onto a single chip as is often done in the art, but includes an arrangement of discrete, non-integrated components.

Each E/O converter array 360 is electrically coupled to the downlink multiplexer 270 in the corresponding multiplexer unit 414. Likewise, each O/E converter array 362 is electrically coupled to the uplink multiplexer 320 in the corresponding multiplexer unit 414. Service units 50 are each electrically coupled to both downlink and uplink multiplexers 270 and 320 within each multiplexer unit 414. Respective downlink and uplink optical fiber cables 378 and 380 optically couple each converter array unit 410 to a corresponding optical fiber cable 220. In an example embodiment, central head-end station 210 includes connector ports 420 and optical cables 220 include connectors 422 adapted to connect to the connector ports. In an example embodiment, connectors 422 are MT ("Mechanical Transfer") connectors, such as the UNICAM® MTP connector available from Corning Cable Systems, Inc., Hickory, N.C. In an example embodiment, connectors 422 are adapted to accommodate electrical power line 168 connected to port 420.

Figure 9:
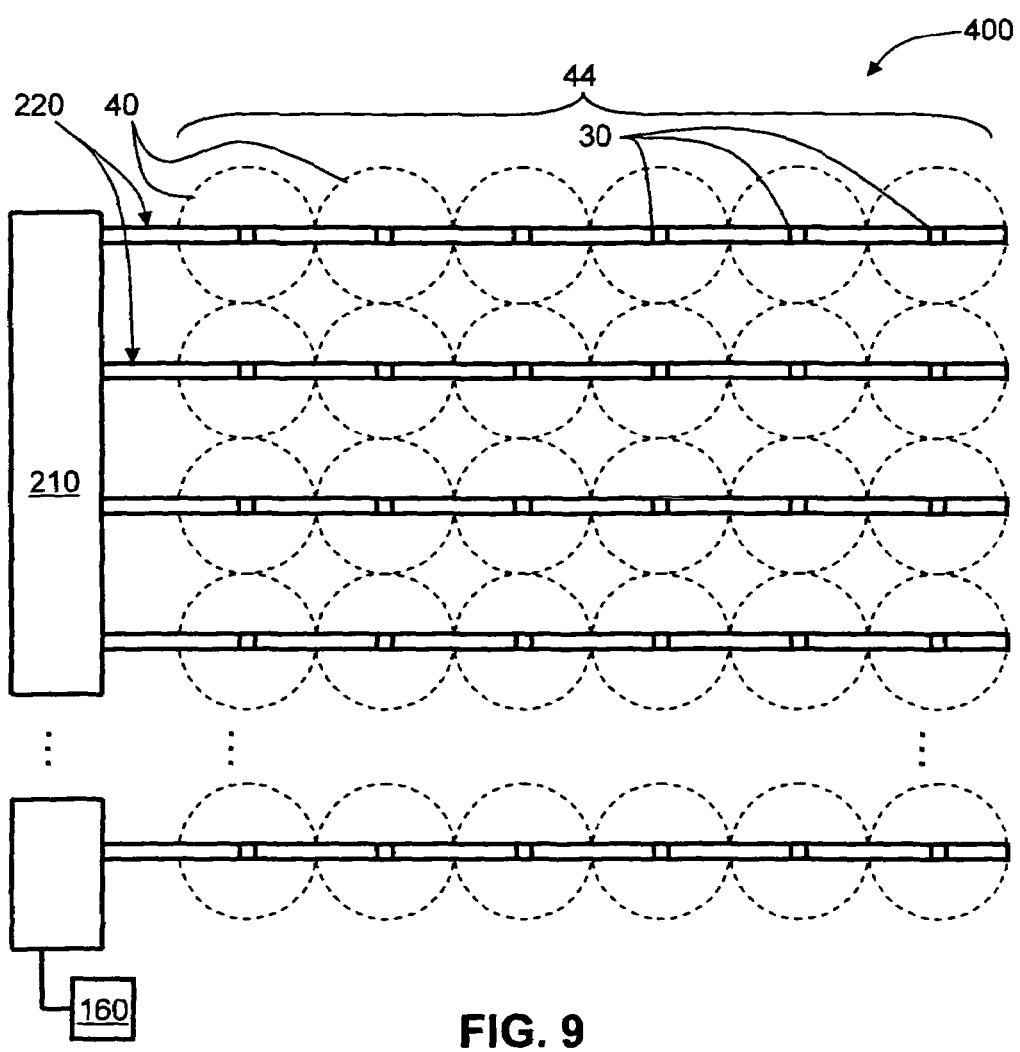
FIG. 9 is a schematic "top-down view" of the system of FIG. 8, illustrating the extended picocell coverage area created by the multiple optical fiber cables.

FIG. 9 is a "top down" view of system 400, showing an extended picocellular coverage area 44 formed by using multiple optical fiber cables 220. In an example embodiment, system 400 supports anywhere from two transponders 30, to hundreds of transponders, to even thousands of transponders. The particular number of transponders employed is not fundamentally limited by the design of system 400, but rather by the particular application.

Method of Operation

System 400 operates in a manner similar to system 200 as described above, except that instead of transponders 30 being in a single optical fiber cable 220 they are distributed over two or more optical fiber cables through the use of corresponding two or more converter array units 410. Electrical signals SD from service units 50 are distributed to each multiplexer unit 414. The downlink multiplexers 270 therein convey electrical signals SD to one, some, or all of the converter array units 410, depending on which transponders are to be addresses by which service unit. Electrical signals SD are then processed as described above, with downlink optical signals SD' being sent to one, some or all of transponders 30. Uplink optical signals SU' generated by client devices in the corresponding picocells 40 return to the corresponding converter units 410 at central head-end station 210. The optical signals SU' are converted to electrical signals SU at the receiving converter unit(s) 410 and are then sent to the uplink multiplexers 320 in the corresponding multiplexer unit(s) 414. Uplink multiplexers 320 therein are adapted (e.g., programmed by controller 250) to direct electrical signals SU to the service unit(s) 50 that require(s) receiving electrical signals SU. The receiving service units 50 process signals SU, which as discussed above in an example embodiment includes one or more of: storing the signal information; digitally processing or conditioning the signals; sending the signals on to one or more outside networks 223 via network links 224; and sending the signals to one or more client devices 45 in picocellular coverage area 44.

Centralized System for a Building Infrastructure

Figure 10:
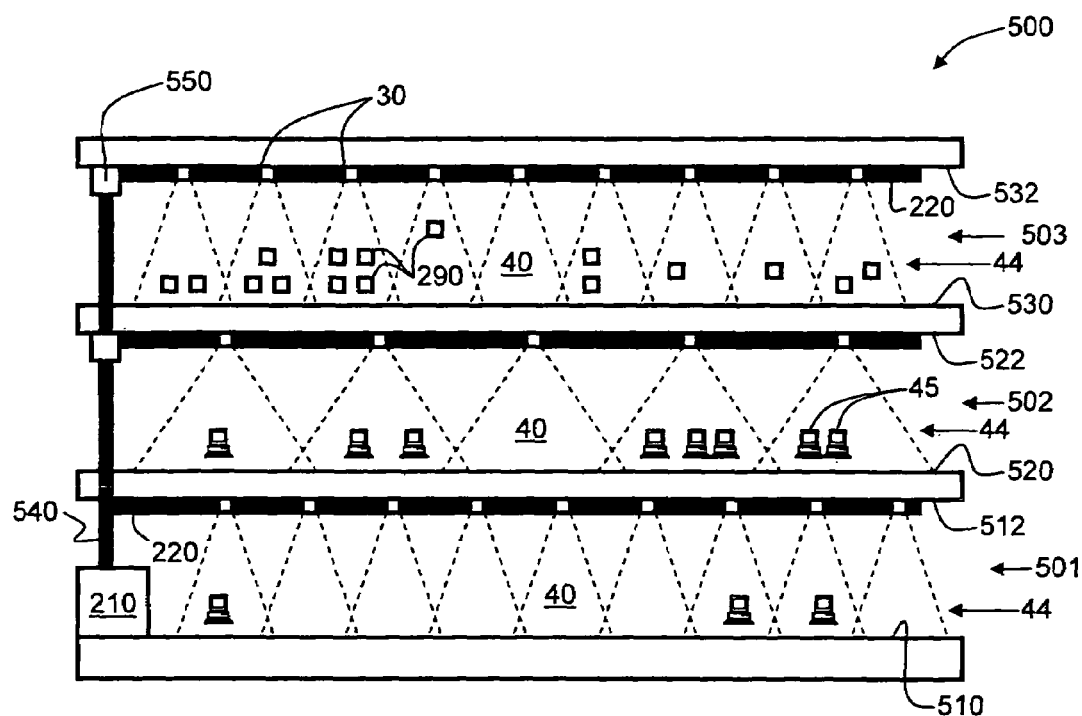
FIG. 10 is a cut-away view of a building infrastructure illustrating an example embodiment wherein the optical-fiber-based wireless picocellular system of the present invention is incorporated into the building infrastructure.

FIG. 10 is a schematic cut-away diagram of a building infrastructure 500 that generally represents any type of building in which the optical-fiber-based wireless picocellular system of the present invention would be useful, such as office buildings, schools, hospitals, college buildings, airports, warehouses, etc. Building infrastructure 500 includes a first (ground) floor 501, a second floor 502, and a third floor 503. First floor 501 is defined by a floor 510 and a ceiling 512, second floor 502 is defined by a floor 520 and a ceiling 522, and third floor 503 is defined by a floor 530 and a ceiling 532. An example centralized optical-fiber-based wireless picocellular system 400 is incorporated into building infrastructure 500 to provide a picocellular coverage area 44 that covers floors 501, 502 and 503.

Figure 11:
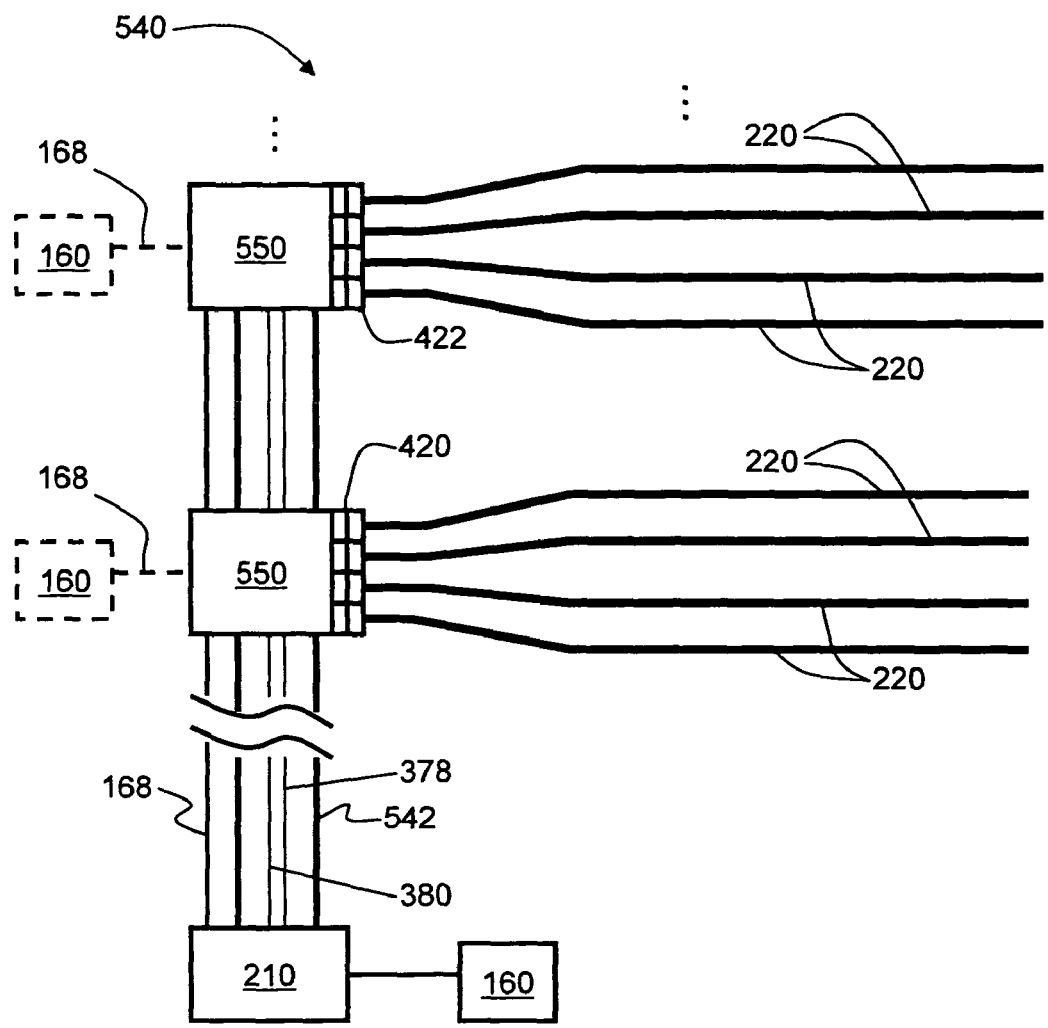
FIG. 11 is a schematic diagram of an example embodiment of a multi-section cable used in the system of FIG. 10 to distribute the transponders throughout the building infrastructure.

In an example embodiment, system 400 includes a main cable 540 having a number of different sections that facilitate the placement of a large number of transponders 30 in building infrastructure 500. FIG. 11 is a schematic diagram of an example embodiment of main cable 540. Cable 540 includes a riser section 542 that carries all of the uplink and downlink optical fiber cables 378 and 380 (FIG. 8) from central head-end station 210. Cabling 540 includes one or more multi-cable (MC) connectors 550 adapted to connect select downlink and uplink optical fiber cables 378 and 380, along with electrical power line 168, to a number of optical fiber cables 220. In an example embodiment, MC connectors 550 include individual optical fiber cable ports 420 and optical fiber cables 220 include matching connectors 422. In an example embodiment, riser section 542 includes a total of seventy-two downlink and seventy-two uplink optical fibers 136D and 136U, while twelve optical fiber cables 220 each carry six downlink and six uplink optical fibers.

Main cable 540 enables multiple optical fiber cables 220 to be distributed throughout building infrastructure 500 (e.g., fixed to ceilings 512, 522 and 532) to provide an extended picocellular coverage area 44 for the first, second and third floors 501, 502 and 503. An example type of MC connector 550 is a "patch panel" used to connect incoming and outgoing optical fiber cables in an optical telecommunication system.

In an example embodiment of multi-section cabling 540, electrical power line 168 from power supply 160 runs from central head-end station 210 through riser section 542 and branches out into optical fiber cables 220 at MC connectors 550. In an alternative example embodiment, electrical power is separately supplied at each MC connector 550, as indicated by the dashed-box power supplies 160 and dashed-line electrical power lines 168.

In an example embodiment, central head-end station 210 and power supply 160 is located within building infrastructure 500 (e.g., in a closet or control room), while in another example embodiment it is located outside of the building at a remote location.

Figure 12:
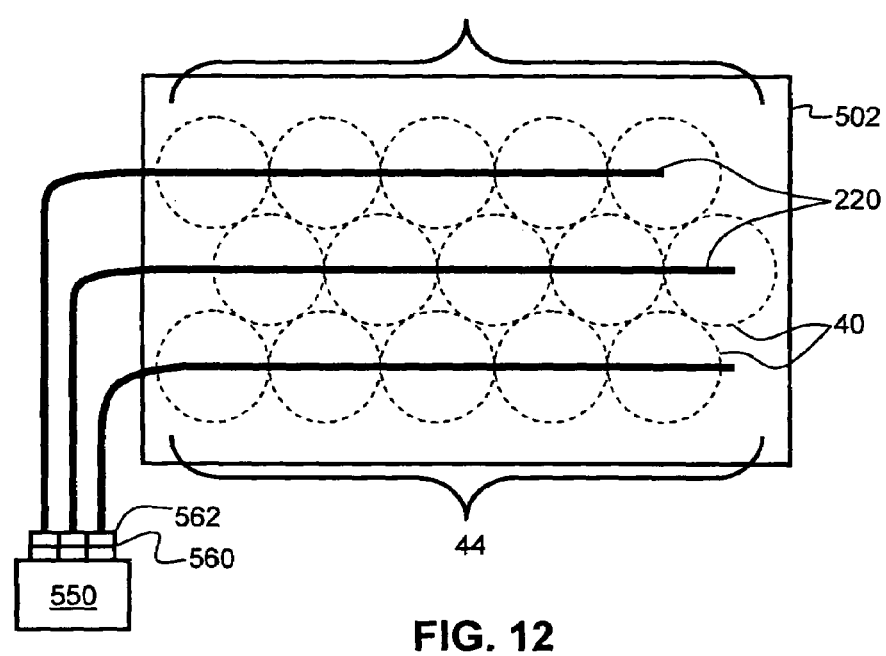
FIG. 12 is a schematic plan view of the second floor of the building infrastructure of FIG. 10, illustrating how three optical fiber cables branch out from the multi-cable connector to create an extended picocellular coverage area for the second floor.

An example embodiment of the present invention involves tailoring or designing the picocellular coverage areas 44 for the different floors to suit particular needs. FIG. 12 is a schematic "top down" view of the second floor 502 of building infrastructure 500, showing three optical fiber cables 220 branching out from MC connector 550 and extending over ceiling 522. Picocells 40 associated with transponders 30 (not shown in FIG. 12) form an extended picocellular coverage area 44 that covers second floor 502 with fewer, larger picocells than the first and third floors 501 and 503 (FIG. 10). Such different picocellular coverage areas 44 may be desirable when the different floors have different wireless needs. For example, third floor 503 might require relatively dense picocell coverage if it serves as storage for items that need to be inventoried and tracked via RFID tags 290 (FIG. 4), which in the present invention can be considered simple client devices 45. Likewise, second floor 502 may be office space that calls for larger and fewer picocells to provide cellular phone service and WLAN coverage.

RoF Optical Fiber Cable System with Diversity Transponders

Figure 13:
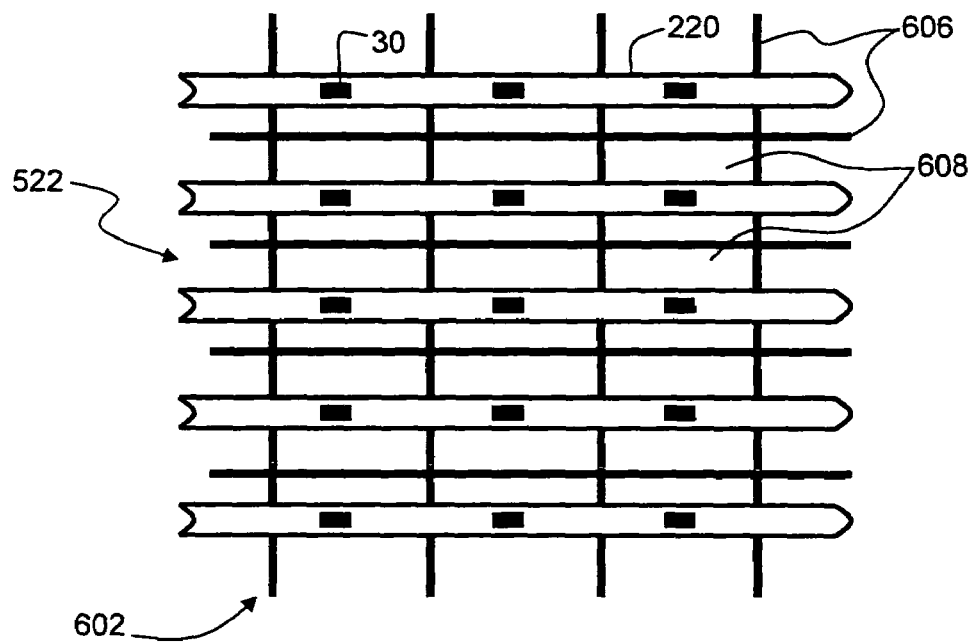
FIG. 13 is a top-down view of an example optical fiber cable system as part of an optical-fiber-based wireless picocellular system, wherein the optical fiber cables are arranged above the suspended ceiling of the building infrastructure shown in FIG. 10.
Figure 14:
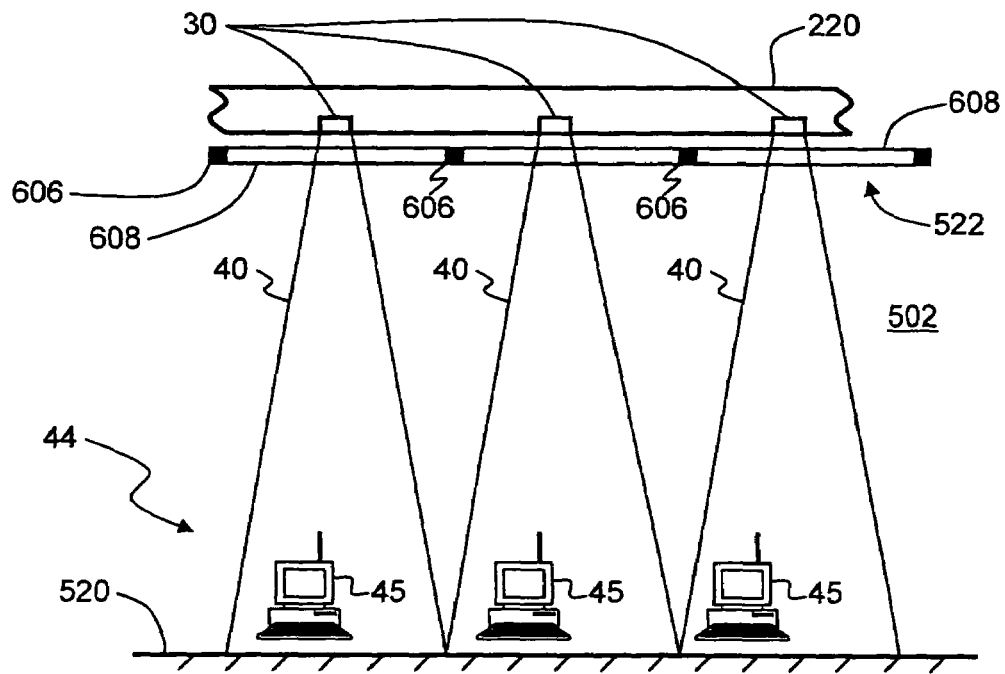
FIG. 14 is a side view of the optical fiber cable system as shown in FIG. 13, illustrating the formation of the picocells by each transponder to form a picocellular coverage area within the room.

FIG. 13 is a top-down view of an example optical fiber cable system that includes a number of optical fiber cables 220 as part of an optical-fiber-based wireless picocellular system such as system 400, wherein the optical fiber cables are arranged between floor 520 and ceiling 522 (FIG. 10) to provide picocellular coverage in room 502. In the example of FIG. 13, ceiling 522 is a drop ceiling having a frame 602 with conducting (e.g., metal) cross members 606 that support ceiling tiles 608. FIG. 14 is a side view of the optical fiber cable system as shown in FIG. 13, illustrating the formation of picocells 40 in room 502 by each transponder 30 to form a picocellular coverage area 44 within the room. FIGS. 13 and 14 illustrate an idealized situation wherein all transponders 30 are unobstructed so that all of the corresponding picocells 40 are all properly formed.

Figure 15:
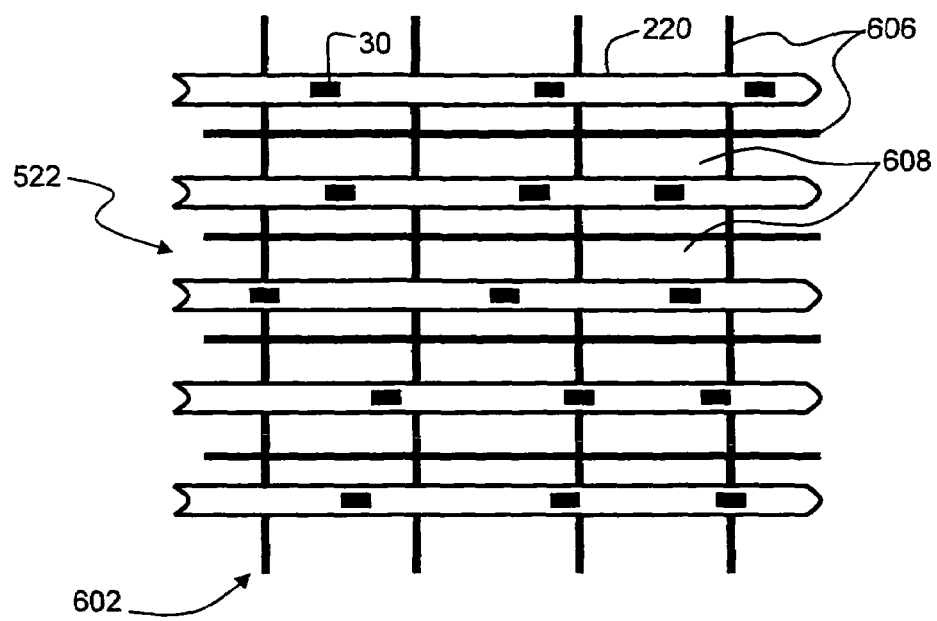
FIG. 15 is similar to FIG. 13, and illustrates how certain transponders in the optical fiber cable system can be obstructed by portions of the ceiling frame of the suspended ceiling.
Figure 16:
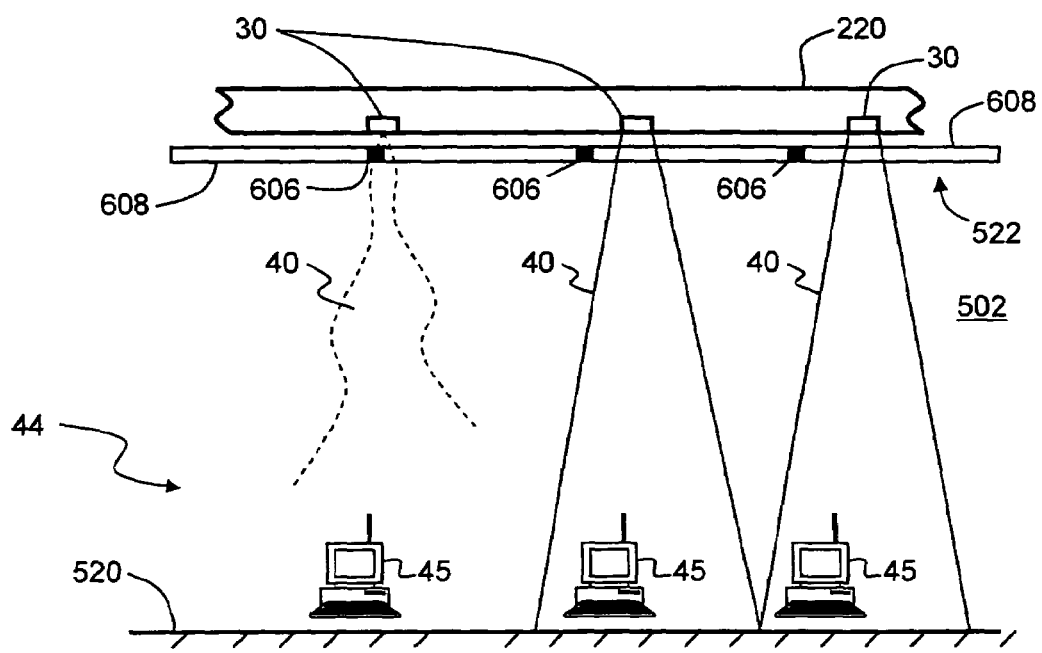
FIG. 16 is similar to FIG. 14, and illustrates how the ceiling frame obstruction shown in FIG. 15 can inhibit the formation of picocells and adversely impact the picocellular coverage area.

FIGS. 15 and 16 are similar diagrams to FIGS. 13 and 14, respectively, and illustrate the case where some of the transponders 30 are obstructed by cross members 606 of ceiling frame 602. Other similar types of obstructions can also occur, such as from electrical cabling, electrical outlets, and other conducting structures (not shown) that are usually found above a suspended ceiling. When such an obstruction occurs, it can adversely affect the radiation pattern from the transponder antenna system 100, which in turn can adversely affect the formation of picocell 40. As illustrated in FIG. 16, the degradation can be severe enough to render obstructed transponder(s) 30 ineffective in communicating with client devices 45 that would otherwise fall within a properly formed picocell 40.

An aspect of the present invention uses transponder diversity to mitigate the above-described performance degradation issues in optical-fiber-based wireless picocellular systems that can arise during and after deployment of the one or more RoF optical fiber cables. Several example embodiments of the present invention that utilize transponder diversity are described below.

In the description below, it is convenient to refer to a transponder 30 as transponder 30A or 30B and an optical fiber cable 220 as optical fiber cable 220A or 220B to reflect how the transponders are grouped. Thus, an optical fiber cable 220 that includes transponders 30A is referenced as 220A, and an optical fiber cable that includes transponders 30B is referenced as 220B. An optical fiber cable that includes both transponders 30A and 30B is referenced as 220AB. Transponders 30A and 30B may have the same or different properties (e.g., antenna polarization), depending on the particular example embodiment.

Figure 17:
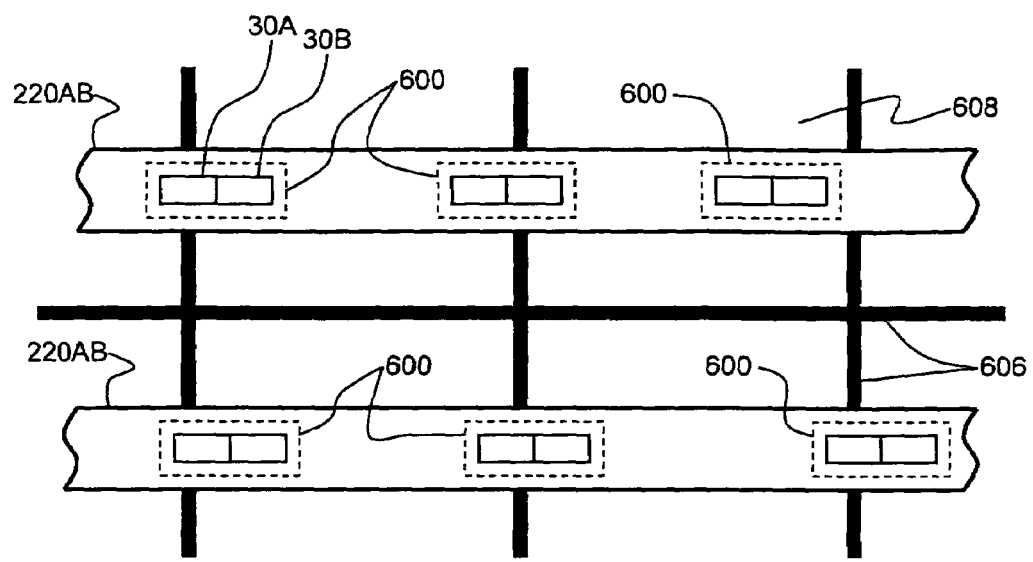
FIG. 17 is a close-up plan view similar to that of FIG. 13 and FIG. 15, and illustrates an example embodiment of an optical fiber cable system that includes one or more optical fiber cables that each have transponders 30A and 30B arranged to provide spatial transponder diversity for the optical fiber cable system.

Optical Fiber Cable System with Single Optical Fiber Cable with Spatial Diversity FIG. 17 is a close-up plan view similar to FIG. 13 and FIG. 15, and illustrates an example embodiment of an optical fiber cable system that includes one or more optical fiber cables 220AB each having transponders 30A and 30B. Transponder diversity is achieved in each optical fiber cable 220AB by spatially arranging two transponders 30A and 30B along the length of each optical fiber cable. Transponders 30A and 30B are arranged close enough to one another to form a transponder group 600, which in the present example embodiment can be called a "transponder pair." Transponders 30A and 30B respectively form substantially co-located picocells 40A and 40B when addressed. In an example embodiment, transponder 30A serves as the main transponder and transponder 30B serves as a backup transponder and thus remains unaddressed. If transponder 30A fails to create an acceptable picocell 40A, then central head-end station 210 (FIG. 8) addresses backup transponder 30B to form picocell 40B. In another example embodiment, the transponder that provides the strongest link with client device(s) 45 (FIG. 7) is used.

Figure 18:
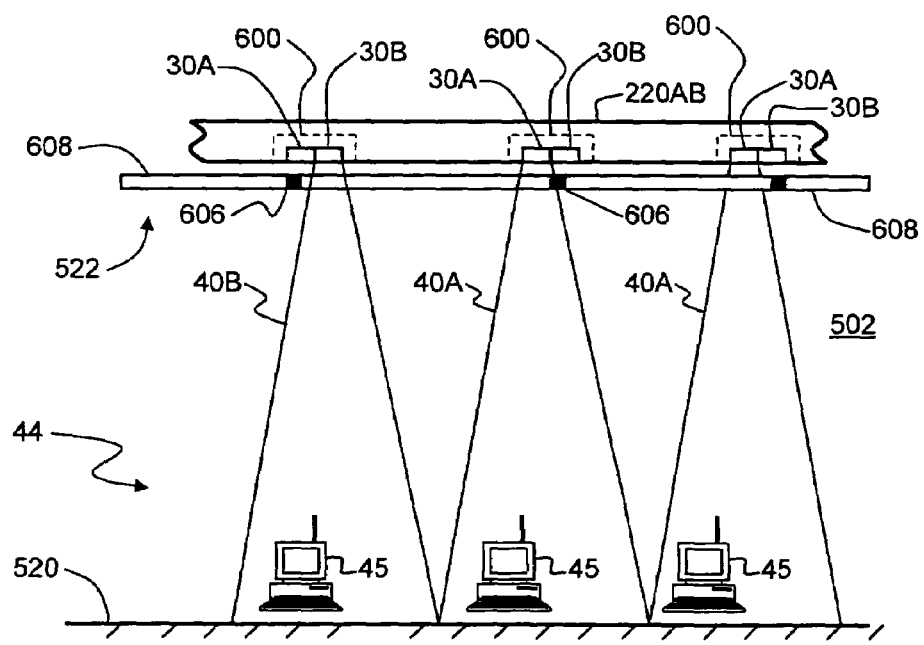
FIG. 18 is similar to FIG. 14 and FIG. 16, and shows how a picocell is formed in the leftmost transponder pair by addressing the rightmost transponder of the pair when the leftmost transponder in the pair is obstructed by ceiling frame cross member.

FIG. 18 is similar to FIG. 14 and FIG. 16 and shows how picocell 40B is formed in the leftmost transponder pair 600 by addressing transponder 30B when transponder 30A is obstructed by ceiling frame cross member 606.

Figure 19:
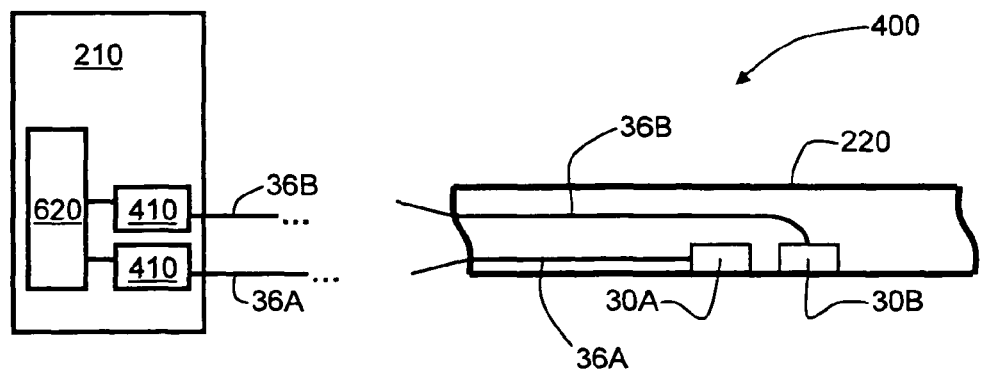
FIG. 19 is a simplified schematic diagram of the wireless picocellular system of FIG. 8, illustrating a modification to the central head-end station to include a diversity combiner that allows for the central head-end station to switch between diversity transponders associated with a given picocell based on signal strength.

FIG. 19 is a simplified schematic diagram of wireless picocellular system 400 of FIG. 8, illustrating a modification to central head-end station 210 to include a diversity combiner 620 electrically coupled to converter array units 410. Transponders 30A and 30B are optically coupled to respective converter array units 410 at central head-end station 210 via respective optical fiber communication links 36A and 36B (FIG. 1). In an example embodiment, diversity combiner 620 at central head-end station 210 compares the signal strengths from each transponder 30A and 30B in each transponder group 600. Central head-end station 210 then addresses, for each transponder group 600, the transponder in the group that has the greatest signal strength. This is accomplished by central head-end station 210 selecting the appropriate downlink optical path (e.g., downlink optical fiber 136D in optical fiber communication link 36A or 36B) for the given "optimum" transponder in the given transponder group 600.

Figure 20:
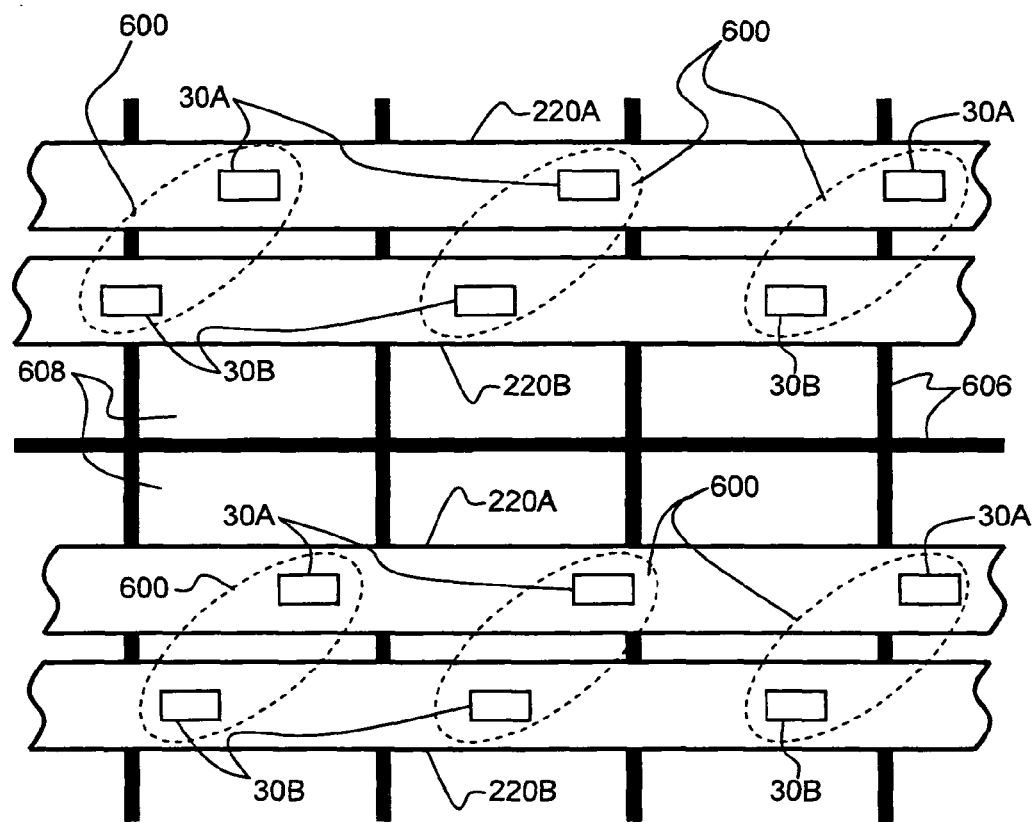
FIG. 20 is a schematic diagram similar to that of FIG. 17, illustrating another example embodiment of an optical fiber cable system according to the present invention, wherein transponder diversity is achieved using pairs of optical fiber cables.

Optical Fiber Cable System with Optical Fiber Cable Pairs that Provide Spatial Diversity FIG. 20 is a schematic diagram similar to that of FIG. 17, illustrating another example embodiment of an optical fiber cable system according to the present invention, wherein transponder diversity is achieved using pairs of optical fiber cables 220A and 220B. Rather than including transponder pairs 600 in a single optical fiber cable, two optical fiber cables 220A and 220B are employed that respectively operably support transponders 30A and 30B that make up each pair 600. Optical fiber cables 220A and 220B are arranged in close proximity so that transponder pairs 600 of transponders 30A and 30B can form corresponding substantially co-located picocells 40A and 40B while providing spatial transponder diversity in a manner similar to the embodiment of FIG. 17.

In an example embodiment, the two-optical-fiber-cable arrangement is expanded to include more than two optical fiber cables 220A and 220B. The main limit on the number of optical fiber cables that can be used is the ability to keep the transponders that constitute transponder group 600 sufficiently close to one another so that the picocells formed by each transponder are substantially co-located.

Optical Fiber Cable System with Polarization Diversity

Figure 21:
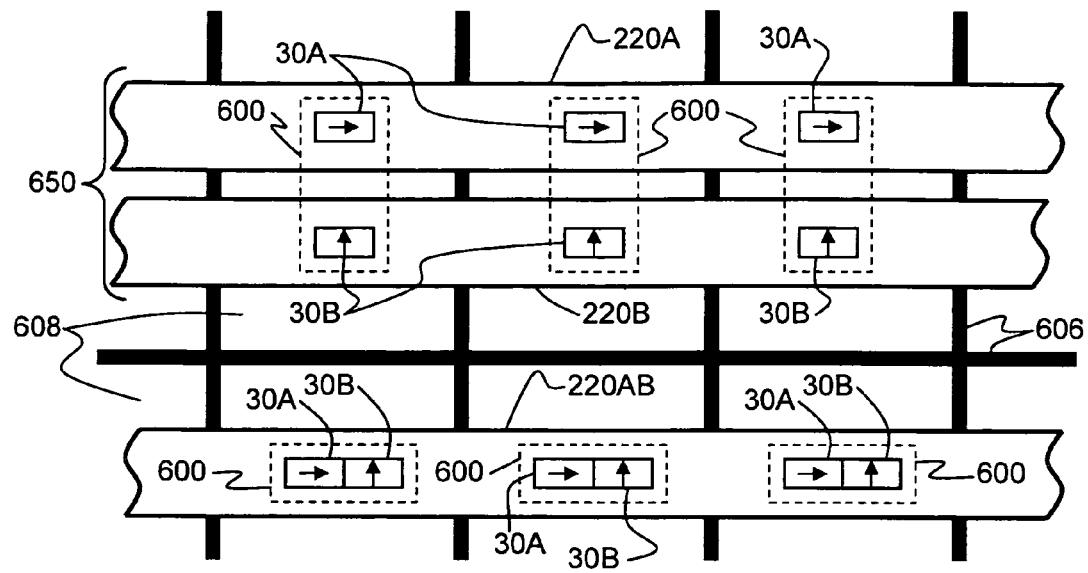
FIG. 21 is a schematic diagram similar to FIG. 20, illustrating two different example embodiments of the optical fiber cable system of the present invention that utilizes either a single optical fiber cable or pairs of optical fiber cables to provide polarization diversity.

FIG. 21 is a schematic diagram similar to FIG. 20, illustrating two different example embodiments of the optical fiber cable system of the present invention that utilizes either a single optical fiber cable 220AB or pairs of optical fiber cables 220A and 220B to provide polarization diversity. In one example embodiment, a pair 650 of proximately located optical fiber cables 220A and 220B are employed, wherein transponders 30A in optical fiber cable 220A have one antenna polarization, e.g., horizontal, as indicated by the arrows within the transponder, while transponders 30B in optical fiber cable 220B have an orthogonal antenna polarization, e.g., vertical. Optical fiber cables 220A and 220B are arranged to form transponder groups 600 in the form of pairs of transponders 30A and 30B. In an example embodiment, antenna system 100 (FIG. 3 and FIG. 4) of each transponder 30A and 30B includes an integrated planar antenna system 100 (not shown) to obtain the different polarizations. Diversity combiner 620 at central head-end station 210 determines the best (e.g., strongest) signal from the orthogonally polarized receiving antennas on the transponders so that the central head-end station addresses the strongest transponder.

In some instances, it may prove inconvenient to have separate optical fiber cables supporting the different transponders and arranging the optical fibers to form the transponder pairs. Accordingly, in a related example embodiment also shown in FIG. 21, a single optical fiber cable 220AB that includes proximately located transponders 30A and 30B having different polarizations is used to form transponder pairs 600.

Figure 22:
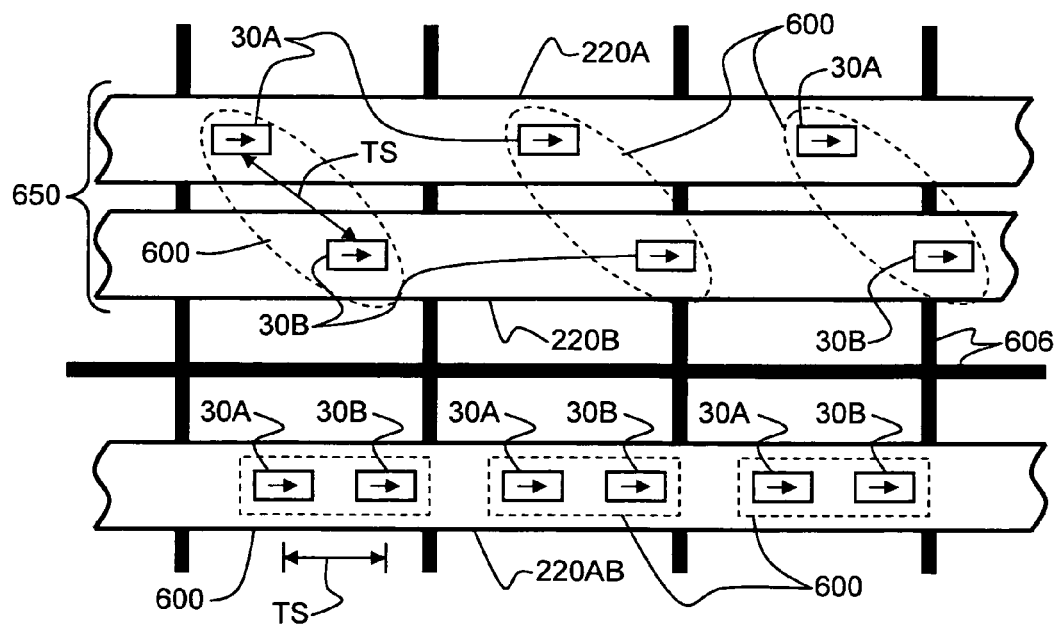
FIG. 22 is a schematic diagram similar to FIG. 21, illustrating an example embodiment where either a single optical fiber cable or a pair of optical fiber cables is/are used to provide spatial diversity for the optical fiber cable system using transponders having the same antenna polarization.

FIG. 22 is a schematic diagram similar to FIG. 21, illustrating an example embodiment of the optical fiber cable system of the present invention, where pair 650 of optical fiber cables 220A and 220B have transponders 30A and 30B with the same antenna polarization (shown as horizontal polarization), but wherein the transponders are arranged in transponder pairs 600 to provide spatial diversity. A related example embodiment is also shown in FIG. 22, wherein a single optical fiber cable 220AB includes transponder pairs 600 made up of transponders 30A and 30B of the same antenna polarization. The arrangement of transponders 30A and 30B in optical fiber 220AB achieves the same diversity effect as the pair 650 of optical fiber cables 210A and 210B.

In an example embodiment, to ensure spatial diversity, the transponder center-to-center spacing TS for transponders in each transponder group 600 (or more precisely, antenna systems 100 of the transponders therein) is in the range from about 1 wavelength ($\lambda$) to about 9$\lambda$ of the frequency f used. In example embodiments, the frequency f is either in the 2.4 GHz band or in the 5.2 GHz band. In an example embodiment, two frequencies $f_1$ and $f_2$ (e.g., frequencies in both the 2.4 GHz and 5.2 GHz band) are used.

Figure 23:
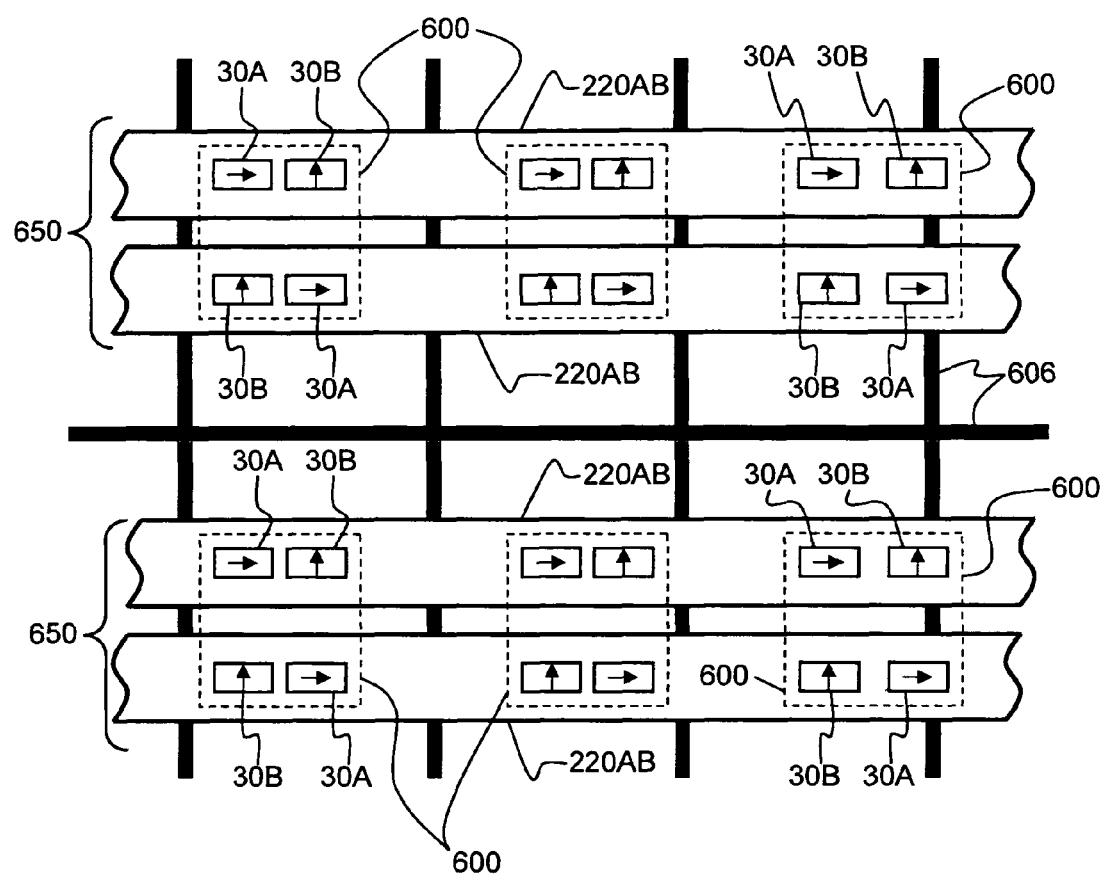
FIG. 23 is a schematic diagram similar to FIG. 22, illustrating how pairs of optical fibers are used in the optical fiber cable system to provide both polarization diversity and spatial diversity.

FIG. 23 is similar to FIG. 22, and illustrates an example embodiment wherein one or more pairs 650 of optical fiber cables 220AB is employed. Each optical fiber 220AB includes both transponders 30A and 30B having orthogonal antenna polarizations. In one optical fiber cable the transponders are arranged in pairs in the order 32A-32B, while the other optical fiber cable the transponder pairs are arranged in the order 32B-32A. The result is that each optical fiber cable pair 650 provides a transponder group 600 having four transponders, wherein the transponder group provides both polarization and spatial transponder diversity. Diversity combiner 620 at central head-end station 210 compares the performance of each transponder in each group 600 so that the central head-end station can address the transponder having the greatest signal strength. In an example embodiment, transponder groups 600 of FIG. 22 are used in combination with diversity antennas on client devices 45 (FIG. 7) to provide a Multiple-Input/Multiple-Output (MIMO) configuration to maximize the performance of system 400. Such an arrangement can be used to achieve an increased bit rate at the same antenna power level.

Advantages and Applications

Support of Multiple Services

The systems of the present invention are transparent to the types of RF services provided by service units 50. In example embodiments, the systems provide a supported frequency band or multiple bands. Any service that can operate within the frequency band and within the designed power and dynamic range can be provided. Multiple services can be supported in either the same band or different bands. An example embodiment of the systems of the present invention support the IMS and UNII bands, but subsets of these bands or additional frequency bands are also employable. In an example embodiment, licensed bands are supported to implement cellular signal distribution.

In an example embodiment, one or more services are added (e.g., via adding new service units 50) to the system after the first service is set up and running.

Distributed Antenna System (DAS)

The systems of the present invention can serve as a distributed antenna system (DAS) that transmits the same signal in some or all of the picocells. This is accomplished by RF signal splitting (and amplification) at the downlink and uplink multiplexers to allow the same information to be transmitted to different transponders. In an example embodiment, this feature is applied to some services only. For example, WLAN high-speed data transmission from one service unit (or service provider) is provided to each picocell, with individual data streams to ensure high throughput rates, while a cellular DAS system is implemented at the same time by repeating a cellular signal provided by a cellular service unit (or service provider). In an example embodiment, cellular DAS is implemented in a different frequency band and runs independently of the WLAN service signal distribution.

In another example embodiment, WLAN service is initially distributed into several picocells as DAS, and when the data rate throughput requirements increase (e.g. due to increased use of the network by more and more users), the central head-end station 210 is reconfigured, e.g., via programming of controller 250 or the addition of hardware, to serve individual picocells. No modification to the transponders or optical fiber cabling hardware is needed. All frequency allocation and power settings are configured at the central head-end station. Also, upgrades to services (e.g. further developments of 802.11 standards), are run through the system without modification to the distributed hardware, with all required changes being made at the central head-end station. Different wireless service providers can be added to or removed from the system at any time.

Picocell Size

In the present invention, the picocell size is limited mostly by RF propagation characteristics of transponders 30. The particular picocell size employed is determined by the particular application. In an example embodiment, the picocells are each sized to cover a select type of region, such as a small conference room, or a cluster of cubicles in an office space. Such picocellular coverage ensures high throughput rates for a WLAN application, for example. Note that the anticipated picocell size can be used to establish the spacing between transponders in the optical fiber cable. Picocells having a diameter smaller than about 6 meters may in some instances prove problematic due to co-channel interference issues when there are only a limited number of frequency bands available.

In an example embodiment, rather than addressing every transponder 30, the system addresses select transponders 30 (e.g., every other transponder) and boosts the power of electrical signals SD in order to create larger picocells 40 to obtain substantially the same size picocellular coverage area 44

Redundancy and Multi-Path Compensation

The use of diversity transponders allows for system redundancy so that if one transponder fails, another transponder in the transponder group can form a substantially co-located picocell to provide continued service. It also allows for maintaining the maximum signal strength so that if one transponder is obstructed to the point where its signal strength is diminished, another transponder in the transponder group can be addressed to provide a substantially co-located picocell with sufficient signal strength. Likewise, variations in signal strength due to the multi-path nature of wireless signals is addressed by selecting transponders in each transponder group having the greatest signal strength to maintain optimum picocell coverage.

Advantages of Optical Fiber Cable System with Spatial and/or Polarization Diversity A RoF optical-fiber-based wireless picocellular system according to the present invention as described above that utilizes two or more transponders for each picocell also provides ease of installation, performance enhancement, and compatibility to future wireless standards, such as the IEEE 802.11n where MIMO antenna technology is planned for enhanced performance. The multiple transponders per picocell provide transmitter and receiver diversity for enhanced performance and compatibility with the future IEEE 802.11n wireless standard.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A radio-over-fiber (RoF) optical fiber cable system with transponder diversity for a RoF wireless picocellular system, the RoF optical fiber cable system comprising:

at least one optical fiber cable;

two or more transponders optically supported by the at least one optical fiber cable, wherein the two or more transponders are arranged to form one or more groups of two or more proximately located transponders, wherein the transponders in a given transponder group are adapted to be sufficiently proximately located to one another to form corresponding two or more co-located picocells for the given transponder group, such that if one of the transponders in the given transponder group is unable to provide service for an area corresponding to a picocell for the given transponder group, another transponder in the given transponder group is adapted to provide continuing service for the area corresponding to the picocell for the given transponder group;

a diversity combiner optically coupled to each transponder and adapted to determine respective signal strengths from each transponder in each transponder group so as to ensure the transponder with the greatest signal strength in a given transponder group is used to form the picocell for the given transponder group.

2. A RoF optical fiber cable system according to claim 1, including one or more pairs of optical fiber cables, wherein each optical fiber cable pair includes:

i) a first optical fiber cable that optically supports one or more transponders;

ii) a second optical fiber cable that optically supports one or more transponders; and wherein the first and second optical fiber cables in each optical fiber cable pair are arranged relative to one another such that the one or more transponders in the first and second optical fiber cables form one or more of said transponder groups.

3. A RoF optical fiber cable system according to claim 2, wherein the one or more transponders of the first optical fiber cable and the one or more transponders of the second optical fiber cable in each optical fiber cable pair have orthogonal antenna polarizations.

4. A RoF optical fiber cable system according to claim 3, wherein the transponders in each transponder group are sufficiently spaced apart to provide spatial diversity.

5. A RoF optical fiber cable system according to claim 2, wherein each transponder group consists of a pair of transponders having orthogonal antenna polarizations.

6. A RoF optical fiber cable system according to claim 1, including one or more optical fiber cables, wherein each optical fiber cable pair includes one or more transponder groups having two or more transponders.

7. A RoF optical fiber cable system according to claim 6, wherein the transponder groups each consist of a pair of transponders having orthogonal antenna polarizations.

8. A RoF optical fiber cable system according to claim 7, wherein the transponders in each transponder group are sufficiently spaced apart to provide spatial diversity.

9. A RoF optical fiber cable system according to claim 1, wherein each transponder has an antenna system that transmits and receives a wavelength $\lambda$ that corresponds to an operating frequency f, and wherein the antenna systems for the transponders in each transponder group are spatially separated from one another by a distance of greater than $1\lambda$ but less than $9\lambda$.

10. A RoF picocellular wireless system comprising:
a RoF optical fiber cable system according to claim 1;
a central head-end station operably coupled to the optical fiber system and that is either operably coupled to or includes the diversity combiner, the central head-end unit adapted to send downlink signals to the transponders in each transponder group; and
wherein the central head-end station sends downlink signals to the select transponder in each transponder group based on the transponder signal strengths provided by the diversity combiner.

11. A RoF picocellular wireless system according to claim 10, wherein each transponder includes one or more microstrip antennas.

12. A RoF picocellular wireless system according to claim 11, wherein the microstrip antenna operates in the 2.4 GHz frequency band and/or the 5.2 GHz frequency band.

13. A radio-over-fiber (RoF) wireless picocellular system comprising:
one or more RoF optical fiber cables adapted to operably support, either individually or collectively, one or more transponder groups each having two or more transponders, wherein each transponder is adapted to form a picocell co-located with picocells formed by the other transponders in the corresponding transponder group, such that if one of the transponders in the given transponder group is unable to provide service for an area corresponding to a picocell for the given transponder group, another transponder in the given transponder group is adapted to provide continuing service for the area corresponding to the picocell for the given transponder group;
a central head-end station optically coupled to the one or more RoF optical fiber cables and adapted to provide downlink optical signals to each transponder and receive uplink optical signals from each transponder;
a diversity combiner operably coupled to or included in the central head-end station and adapted to receive uplink signals from each transponder to determine relative uplink signal strengths from each transponder in each transponder group, including a greatest uplink signal strength; and
wherein the central head-end station provides the downlink optical signals to the transponder in each transponder group having the greatest uplink signal strength.

14. A RoF wireless picocellular system according to claim 13, wherein each transponder group includes at least two transponders having either orthogonal or parallel antenna polarizations.

15. A RoF wireless picocellular system according to claim 13, wherein the transponders that constitute a given transponder group are located in the same optical fiber cable.

16. A RoF wireless picocellular system according to claim 13, wherein the transponders that constitute a given transponder group are located in adjacent optical fiber cables.

17. A method of providing transponder diversity in a wireless picocellular system, comprising:
optically supporting in one or more radio-over-fiber optical fiber cables one or more transponder groups each having two or more transponders, wherein the transponders in each transponder group are arranged to be sufficiently proximately located to one another to form co-located picocells for the given transponder group, such that if one of the transponders in the given transponder group is unable to provide service for an area corresponding to a picocell for the given transponder group, another transponder in the given transponder group is adapted to provide continuing service for the area corresponding to the picocell for the given transponder group;
determining whether a transponder in a given transponder group has a greater signal strength than the other transponders; and
addressing the transponder having the greater signal strength.

18. A method according to claim 17, including forming each transponder group with transponders having first and second orthogonal antenna polarizations.

19. A method according to claim 17, including forming each transponder group with transponders from different optical fiber cables.

20. A method according to claim 17, including forming each transponder group with transponders from the same optical fiber cable.

* * * * *